US012750921B2

(12) United States Patent
Karimidehkordi et al.

(10) Patent No.: US 12,750,921 B2
(45) Date of Patent: Sep. 29, 2026

(54) APPARATUS, METHOD, AND COMPUTER PROGRAM FOR RECEIVING AN EARLY PAGING INDICATION AND A CONFIGURATION FOR PERFORMING CALL MEASURMENTS

(71) Applicant: Nokia Technologies Oy, Espoo (FI)

(72) Inventors: Ali Karimidehkordi, Munich (DE); Halit Murat Gürsu, Munich (DE); Lars Dalsgaard, Oulu (FI); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 282 days.

(21) Appl. No.: 18/495,014

(22) Filed: Oct. 26, 2023

(65) Prior Publication Data

US 2024/0163968 A1 May 16, 2024

(30) Foreign Application Priority Data

Nov. 11, 2022 (FI) ..................................... 20226017

(51) Int. Cl.
*H04W 76/38* (2018.01)
*H04W 68/00* (2009.01)
*H04W 76/27* (2018.01)

(52) U.S. Cl.
CPC ......... *H04W 76/38* (2018.02); *H04W 68/005* (2013.01); *H04W 76/27* (2018.02)

(58) Field of Classification Search
CPC ... H04W 24/10; H04W 68/005; H04W 76/27; H04W 76/30
See application file for complete search history.

(56) References Cited

U.S. PATENT DOCUMENTS

| | | | | |
|---|---|---|---|---|
| 11,510,176 B2 * | 11/2022 | He | | H04W 68/005 |
| 12,069,609 B2 * | 8/2024 | He | | H04W 68/02 |
| 12,349,104 B2 * | 7/2025 | Yang | | H04W 68/005 |
| 12,470,961 B2 * | 11/2025 | Siomina | | H04W 24/10 |
| 2022/0070783 A1 | 3/2022 | Hsieh et al. | | |
| 2022/0150739 A1 | 5/2022 | Da Silva et al. | | |
| 2022/0217636 A1 | 7/2022 | Shrivastava et al. | | |

(Continued)

FOREIGN PATENT DOCUMENTS

| | | |
|---|---|---|
| WO | 2020/166952 A1 | 8/2020 |
| WO | 2021/214517 A1 | 10/2021 |

(Continued)

OTHER PUBLICATIONS

"New WID on Further NR mobility enhancements", 3GPP TSG RAN Meeting #94e, RP-213565, Agenda Item: 8A.2, MediaTek, Dec. 6-17, 2021, 5 pages.

(Continued)

*Primary Examiner* — Jason D Cardone
(74) *Attorney, Agent, or Firm* — BURR & FORMAN LLP

(57) ABSTRACT

There is provided an apparatus, method and computer program for causing an apparatus for a serving network access node serving a user equipment to perform: signalling, to the user equipment when the user equipment is in an energy saving mode, an early paging indication and first reconfiguration information, the first reconfiguration information comprising a first configuration for configuring the user equipment to perform first measurements for a plurality of cells.

20 Claims, 9 Drawing Sheets

(56) References Cited

U.S. PATENT DOCUMENTS

| | | | | |
|---|---|---|---|---|
| 2022/0312354 | A1 | 9/2022 | Teyeb et al. | |
| 2023/0388077 | A1* | 11/2023 | Maleki | H04L 5/0051 |
| 2024/0107353 | A1* | 3/2024 | Park | H04B 17/318 |
| 2024/0155398 | A1* | 5/2024 | Li | H04W 24/10 |
| 2024/0236941 | A1* | 7/2024 | Esswie | H04W 52/0216 |
| 2025/0254749 | A1* | 8/2025 | Cui | H04W 76/28 |
| 2026/0019850 | A1* | 1/2026 | Kazmi | H04W 24/10 |
| 2026/0040115 | A1* | 2/2026 | Hong | H04W 24/10 |
| 2026/0052414 | A1* | 2/2026 | Park | H04W 24/10 |
| 2026/0101208 | A1* | 4/2026 | Tao | H04W 24/08 |

FOREIGN PATENT DOCUMENTS

| | | | |
|---|---|---|---|
| WO | 2021/235860 | A1 | 11/2021 |
| WO | 2022/155642 | A1 | 7/2022 |
| WO | 2022/192124 | A1 | 9/2022 |

OTHER PUBLICATIONS

"3rd Generation Partnership Project; Technical Specification Group Radio Access Network; NR; Requirements for support of radio resource management (Release 17)", 3GPP TS 38.133, V17.3.0, Sep. 2021, 3206 pages.

"Discussion on requirements of FR2 measurements for DC/CA setup/resume", 3GPP TSG-RAN WG4 Meeting #104-e, R4-2212869, Agenda item: 11.16.2, Nokia, Aug. 15-26, 2022, 16 pages.

Lauridsen et al., "Study of Paging Enhancements for UE Energy Saving in 5G New Radio", IEEE 93rd Vehicular Technology Conference (VTC2021-Spring), Apr. 25-28, 2021, 6 pages.

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

"Feasible solutions for FR2 SCell/SCG setup/resume delay enhancements", 3GPP TSG-RAN WG4 Meeting #105, R4-2219442, Agenda item: 8.21.2, Nokia, Nov. 14-18, 2022, 10 pages.

"3rd Generation Partnership Project; Technical Specification Group Radio Access Network; NR; User Equipment (UE) radio access capabilities (Release 17)", 3GPP TS 38.306, V17.2.0, Sep. 2022, pp. 1-244.

"Revised WID on Further NR mobility enhancements", 3GPP TSG RAN Meeting #96, RP-221799, Agenda Item: 9.3.2.1, MediaTek Inc., Jun. 6-9, 2022, 5 pages.

"3rd Generation Partnership Project; Technical Specification Group Radio Access Network; NR; Requirements for support of radio resource management (Release 17)", 3GPP TS 38.133, V17.7.0, Sep. 2022, 5193 pages.

"3rd Generation Partnership Project; Technical Specification Group Radio Access Network; NR; Medium Access Control (MAC) protocol specification (Release 17)", 3GPP TS 38.321, V17.2.0, Sep. 2022, pp. 1-246.

"3rd Generation Partnership Project; Technical Specification Group Radio Access Network; NG-RAN; Xn application protocol (XnAP) (Release 17)", 3GPP TS 38.423, V17.2.0, Sep. 2022, pp. 1-614.

"Msc-generator", Sourceforge, Retrieved on Nov. 7, 2023, Webpage available at : https://sourceforge.net/ projects/msc-generator/.

"Discussion on early measurement collection (CRs included)"; 3GPP TSG-RAN WG3 Meeting #117, R3-224682, Agenda item: 9.2.4, Huawei, Aug. 15-24, 2022, 13 pages.

"RAN3 Work Plan for Rel-18 Further NR Mobility Enhancements Wi", 3GPP TSG-RAN WG3 Meeting #117-e, R3-224277, Agenda Item: 14.1, MediaTek Inc, Aug. 15-24, 2022, pp. 1-5.

"Discussion on the study of improvement on FR2 Scell/SCG setup/resume", 3GPP TSG RAN WG4 Meeting #104-e, R4-2213903, Agenda Item: 11.16.2, Ericsson, Aug. 15-26, 2022, pp. 1-3.

"WF on R18 Further NR mobility enhancement—Improvement on SCell/SCG setup delay and Enhanced CHO", 3GPP TSG-RAN WG4 Meeting #108bis, R4-2317328, Agenda item: 5.25.4, Apple, Oct. 9-13, 2023, 7 pages.

"3rd Generation Partnership Project, Technical Specification Group Radio Access Network; Evolved Universal Terrestrial Radio Access (E-UTRA) and NR; Multi-connectivity; Stage 2 (Release 17)", 3GPP TS 37.340, V17.2.0, Sep. 2022, pp. 1-112.

Office Action received for corresponding Finnish Application No. 20226017, dated Apr. 4, 2023, 13 pages.

Extended European Search Report received for corresponding European Patent Application No. 23207071.4, dated Apr. 10, 2024, 11 pages.

* cited by examiner

APPARATUS, METHOD, AND COMPUTER PROGRAM FOR RECEIVING AN EARLY PAGING INDICATION AND A CONFIGURATION FOR PERFORMING CALL MEASURMENTS

FIELD OF THE DISCLOSURE

The examples described herein generally relate to apparatus, methods, and computer programs, and more particularly (but not exclusively) to apparatus, methods and computer programs for apparatuses.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to a first aspect, there is provided a method for a user equipment, the method comprising: receiving, from a serving network access node when the user equipment is in an energy saving mode, an early paging indication and first reconfiguration information, the first reconfiguration information comprising a first configuration for configuring the user equipment for performing measurements for a plurality of cells; performing first measurements according to the first configuration when the user equipment is in the energy saving mode; and depending on the first measurements, identifying and performing at least one action.

The identifying and performing at least one action may comprise causing the first measurements to be reported by: receiving, from the serving network access node when the user equipment is in an energy saving mode, a paging message after receiving the early paging indication; signalling, to the serving network access node, an indication that the first measurements are available or an indication that measurement values previously signalled to the network access node are valid; transitioning to the connected mode after signalling said indication that the first measurements are available or the indication that measurement values previously signalled to the network access node are valid; and after said transitioning, signalling the first measurements to the serving network access node.

The method may comprise, prior to entering the energy saving mode: receiving, from the serving network node, a second configuration for configuring the user equipment to perform second measurements for at least one of dual carrier operation and/or carrier aggregation operation; and, after entering the energy saving mode and before receiving the first configuration: performing second measurements according to the second configuration until a timer associated with the second configuration expires or until the first measurements according to the first configuration are performed.

The method may comprise providing at least some of the second measurements to the serving network access node.

The at least one action may comprise: reporting the first measurements to the serving network access node, applying a candidate cell configuration related to the measured cell, or selecting and connecting to a cell for providing network access to the user equipment.

The energy saving mode may be at least one of a radio resource control IDLE mode or a radio resource control INACTIVE mode.

The first configuration may comprise an instruction to perform at least one of the following for said configuring the user equipment for performing measurements: Stop performing any previously configured dual carrier and/or carrier aggregation measurement configuration; Start performing any previously configured dual carrier and/or carrier aggregation measurement configuration; Switch from obtaining measurements according to a first previously configured measurement configuration to obtaining measurements according to a second previously configured measurement configuration; Perform measurements using a higher or lower periodicity than a periodicity previously used to perform measurements; Perform measurements over a single carrier and/or cell; Stop performing any previously configured dual carrier and/or carrier aggregation measurement configuration after a preconfigured timer has expired; Continue performing any previously configured dual carrier and/or carrier aggregation measurement configuration after a preconfigured timer has expired; Store and/or erase measurements obtained using a previously configured dual carrier and/or carrier aggregation measurement configuration; or Determine a validity of at least one previously performed measurement.

Configuring the user equipment for performing measurements for a plurality of cells may be performed for configuring at least one of dual carrier operation or carrier aggregation operation.

The first configuration may comprise at least one of: a list of cells; a list of early paging indicators that maps to a list of cells; a list of paging occasions that maps to a list of cells; or an indication of a user equipment action to be performed when a measurement of at least one of said plurality of cells fulfils a predetermined condition.

According to a second aspect, there is provided a method fora serving network access node serving a user equipment, the method comprising: signalling, to the user equipment when the user equipment is in an energy saving mode, an early paging indication and first reconfiguration information, the first reconfiguration information comprising a first configuration for configuring the user equipment to perform first measurements for a plurality of cells.

The method may comprise receiving, from the user equipment when the user equipment is in a connected mode, the first measurements made in accordance with the first configuration and/or an indication of a cell selected by the user equipment for providing network access to the user equipment, or an indication of a candidate cell configuration related to the measured cell applied by the user equipment.

The method may comprise: signalling, to the user equipment when the user equipment is in the energy saving mode, a paging message after signalling the early paging indication; and receiving, from the user equipment, an indication that the first measurements are available or an indication that measurement values previously signalled to the network access node are valid.

The method may comprise, prior to the user equipment entering the energy saving mode: signalling, to the user equipment, a second configuration for configuring the user equipment to perform second measurements for at least one of dual carrier operation and/or carrier aggregation operation.

The method may comprise: grouping the user equipment into a first group in dependence on a similarity of at least one capability or configuration of the user equipment to other user equipment in the first group.

The method may comprise: determining to configure the user equipment with the first reconfiguration information in dependence on a determination that: a number of user equipment currently being served by at least one cell and/or carrier being considered for dual carrier and/or carrier aggregation is above a first predetermined threshold, a current load of at least one cell and/or carrier being considered for dual carrier and/or carrier aggregation is above a second predetermined threshold, an availability of at least one cell and/or carrier being considered for dual carrier and/or carrier aggregation, and/or whether a determined service is supported by at least one cell and/or carrier being considered for dual carrier and/or carrier aggregation.

The method may comprise: signalling the first configuration to at least one access node controlling at least one of said plurality of cells.

The energy saving mode may be at least one of a radio resource control IDLE mode or a radio resource control INACTIVE mode.

The first configuration may comprise an instruction to perform at least one of the following for said configuring the user equipment for performing measurements: Stop performing any previously configured dual carrier and/or carrier aggregation measurement configuration; Start performing any previously configured dual carrier and/or carrier aggregation measurement configuration; Switch from obtaining measurements according to a first previously configured measurement configuration to obtaining measurements according to a second previously configured measurement configuration; Perform measurements using a higher or lower periodicity than a periodicity previously used to perform measurements; Perform measurements over a single carrier and/or cell; Stop performing any previously configured dual carrier and/or carrier aggregation measurement configuration after a preconfigured timer has expired; Continue performing any previously configured dual carrier and/or carrier aggregation measurement configuration after a preconfigured timer has expired; Store and/or erase measurements obtained using a previously configured dual carrier and/or carrier aggregation measurement configuration; or Determine a validity of at least one previously performed measurement.

Configuring the user equipment for performing measurements for a plurality of cells may be performed for configuring at least one of dual carrier operation or carrier aggregation operation.

The first configuration may comprise at least one of: a list of cells; a list of early paging indicators that maps to a list of cells; a list of paging occasions that maps to a list of cells; or an indication of a user equipment action to be performed when a measurement of at least one of said plurality of cells fulfils a predetermined condition.

According to a third aspect, there is provided an apparatus for a user equipment, the apparatus comprising means for: receiving, from a serving network access node when the user equipment is in an energy saving mode, an early paging indication and first reconfiguration information, the first reconfiguration information comprising a first configuration for configuring the user equipment for performing measurements for a plurality of cells; performing first measurements according to the first configuration when the user equipment is in the energy saving mode; and depending on the first measurements, identifying and performing at least one action.

The means for identifying and performing at least one action may comprise means for causing the first measurements to be reported by: receiving, from the serving network access node when the user equipment is in an energy saving mode, a paging message after receiving the early paging indication; signalling, to the serving network access node, an indication that the first measurements are available or an indication that measurement values previously signalled to the network access node are valid; transitioning to the connected mode after signalling said indication that the first measurements are available or the indication that measurement values previously signalled to the network access node are valid; and after said transitioning, signalling the first measurements to the serving network access node.

The apparatus may comprise means for, prior to entering the energy saving mode: receiving, from the serving network node, a second configuration for configuring the user equipment to perform second measurements for at least one of dual carrier operation and/or carrier aggregation operation; and, after entering the energy saving mode and before receiving the first configuration: performing second measurements according to the second configuration until a timer associated with the second configuration expires or until the first measurements according to the first configuration are performed.

The apparatus may comprise means for providing at least some of the second measurements to the serving network access node.

The at least one action may comprise: reporting the first measurements to the serving network access node, applying a candidate cell configuration related to the measured cell, or selecting and connecting to a cell for providing network access to the user equipment.

The energy saving mode may be at least one of a radio resource control IDLE mode or a radio resource control INACTIVE mode.

The first configuration may comprise an instruction to perform at least one of the following for said configuring the user equipment for performing measurements: Stop performing any previously configured dual carrier and/or carrier aggregation measurement configuration; Start performing any previously configured dual carrier and/or carrier aggregation measurement configuration; Switch from obtaining measurements according to a first previously configured measurement configuration to obtaining measurements according to a second previously configured measurement configuration; Perform measurements using a higher or lower periodicity than a periodicity previously used to perform measurements; Perform measurements over a single carrier and/or cell; Stop performing any previously configured dual carrier and/or carrier aggregation measurement configuration after a preconfigured timer has expired; Continue performing any previously configured dual carrier and/or carrier aggregation measurement configuration after a preconfigured timer has expired; Store and/or erase measurements obtained using a previously configured dual carrier and/or carrier aggregation measurement configuration; or Determine a validity of at least one previously performed measurement.

Configuring the user equipment for performing measurements for a plurality of cells may be performed for configuring at least one of dual carrier operation or carrier aggregation operation.

The first configuration may comprise at least one of: a list of cells; a list of early paging indicators that maps to a list of cells; a list of paging occasions that maps to a list of cells; or an indication of a user equipment action to be performed when a measurement of at least one of said plurality of cells fulfils a predetermined condition.

According to a fourth aspect, there is provided an apparatus for a serving network access node serving a user equipment, the apparatus comprising means for: signalling, to the user equipment when the user equipment is in an energy saving mode, an early paging indication and first reconfiguration information, the first reconfiguration information comprising a first configuration for configuring the user equipment to perform first measurements for a plurality of cells.

The apparatus may comprise means for receiving, from the user equipment when the user equipment is in a connected mode, the first measurements made in accordance with the first configuration and/or an indication of a cell selected by the user equipment for providing network access to the user equipment, or an indication of a candidate cell configuration related to the measured cell applied by the user equipment.

The apparatus may comprise means for: signalling, to the user equipment when the user equipment is in the energy saving mode, a paging message after signalling the early paging indication; and receiving, from the user equipment, an indication that the first measurements are available or an indication that measurement values previously signalled to the network access node are valid.

The apparatus may comprise means for, prior to the user equipment entering the energy saving mode: signalling, to the user equipment, a second configuration for configuring the user equipment to perform second measurements for at least one of dual carrier operation and/or carrier aggregation operation.

The apparatus may comprise means for: grouping the user equipment into a first group in dependence on a similarity of at least one capability or configuration of the user equipment to other user equipment in the first group.

The apparatus may comprise means for: determining to configure the user equipment with the first reconfiguration information in dependence on a determination that: a number of user equipment currently being served by at least one cell and/or carrier being considered for dual carrier and/or carrier aggregation is above a first predetermined threshold, a current load of at least one cell and/or carrier being considered for dual carrier and/or carrier aggregation is above a second predetermined threshold, an availability of at least one cell and/or carrier being considered for dual carrier and/or carrier aggregation, and/or whether a determined service is supported by at least one cell and/or carrier being considered for dual carrier and/or carrier aggregation.

The apparatus may comprise means for: signalling the first configuration to at least one access node controlling at least one of said plurality of cells.

The energy saving mode may be at least one of a radio resource control IDLE mode or a radio resource control INACTIVE mode.

The first configuration may comprise an instruction to perform at least one of the following for said configuring the user equipment for performing measurements: Stop performing any previously configured dual carrier and/or carrier aggregation measurement configuration; Start performing any previously configured dual carrier and/or carrier aggregation measurement configuration; Switch from obtaining measurements according to a first previously configured measurement configuration to obtaining measurements according to a second previously configured measurement configuration; Perform measurements using a higher or lower periodicity than a periodicity previously used to perform measurements; Perform measurements over a single carrier and/or cell; Stop performing any previously configured dual carrier and/or carrier aggregation measurement configuration after a preconfigured timer has expired; Continue performing any previously configured dual carrier and/or carrier aggregation measurement configuration after a preconfigured timer has expired; Store and/or erase measurements obtained using a previously configured dual carrier and/or carrier aggregation measurement configuration; or Determine a validity of at least one previously performed measurement.

Configuring the user equipment for performing measurements for a plurality of cells may be performed for configuring at least one of dual carrier operation or carrier aggregation operation.

The first configuration may comprise at least one of: a list of cells; a list of early paging indicators that maps to a list of cells; a list of paging occasions that maps to a list of cells; or an indication of a user equipment action to be performed when a measurement of at least one of said plurality of cells fulfils a predetermined condition.

According to a fifth aspect, there is provided an apparatus for a user equipment, the apparatus comprising: at least one processor; and at least one memory comprising code that, when executed by the at least one processor, causes the apparatus to perform: receiving, from a serving network access node when the user equipment is in an energy saving mode, an early paging indication and first reconfiguration information, the first reconfiguration information comprising a first configuration for configuring the user equipment for performing measurements for a plurality of cells; performing first measurements according to the first configuration when the user equipment is in the energy saving mode; and depending on the first measurements, identifying and performing at least one action.

The identifying and performing at least one action may comprise means for causing the first measurements to be reported by: receiving, from the serving network access node when the user equipment is in an energy saving mode, a paging message after receiving the early paging indication; signalling, to the serving network access node, an indication that the first measurements are available or an indication that measurement values previously signalled to the network access node are valid; transitioning to the connected mode after signalling said indication that the first measurements are available or the indication that measurement values previously signalled to the network access node are valid; and after said transitioning, signalling the first measurements to the serving network access node.

The apparatus may be caused to perform, prior to entering the energy saving mode: receiving, from the serving network node, a second configuration for configuring the user equipment to perform second measurements for at least one of dual carrier operation and/or carrier aggregation operation; and, after entering the energy saving mode and before receiving the first configuration: performing second measurements according to the second configuration until a timer associated with the second configuration expires or until the first measurements according to the first configuration are performed.

The apparatus may be caused to perform providing at least some of the second measurements to the serving network access node.

The apparatus may be caused to perform: reporting the first measurements to the serving network access node, applying a candidate cell configuration related to the measured cell, or selecting and connecting to a cell for providing network access to the user equipment.

The energy saving mode may be at least one of a radio resource control IDLE mode or a radio resource control INACTIVE mode.

The first configuration may comprise an instruction to perform at least one of the following for said configuring the user equipment for performing measurements: Stop performing any previously configured dual carrier and/or carrier aggregation measurement configuration; Start performing any previously configured dual carrier and/or carrier aggregation measurement configuration; Switch from obtaining measurements according to a first previously configured measurement configuration to obtaining measurements according to a second previously configured measurement configuration; Perform measurements using a higher or lower periodicity than a periodicity previously used to perform measurements; Perform measurements over a single carrier and/or cell; Stop performing any previously configured dual carrier and/or carrier aggregation measurement configuration after a preconfigured timer has expired; Continue performing any previously configured dual carrier and/or carrier aggregation measurement configuration after a preconfigured timer has expired; Store and/or erase measurements obtained using a previously configured dual carrier and/or carrier aggregation measurement configuration; or Determine a validity of at least one previously performed measurement.

Configuring the user equipment for performing measurements for a plurality of cells may be performed for configuring at least one of dual carrier operation or carrier aggregation operation.

The first configuration may comprise at least one of: a list of cells; a list of early paging indicators that maps to a list of cells; a list of paging occasions that maps to a list of cells; or an indication of a user equipment action to be performed when a measurement of at least one of said plurality of cells fulfils a predetermined condition.

According to a sixth aspect, there is provided an apparatus for a serving network access node serving a user equipment, the apparatus comprising: at least one processor; and at least one memory comprising code that, when executed by the at least one processor, causes the apparatus to perform: signalling, to the user equipment when the user equipment is in an energy saving mode, an early paging indication and first reconfiguration information, the first reconfiguration information comprising a first configuration for configuring the user equipment to perform first measurements for a plurality of cells.

The apparatus may be caused to perform receiving, from the user equipment when the user equipment is in a connected mode, the first measurements made in accordance with the first configuration and/or an indication of a cell selected by the user equipment for providing network access to the user equipment, or an indication of a candidate cell configuration related to the measured cell applied by the user equipment.

The apparatus may be caused to perform: signalling, to the user equipment when the user equipment is in the energy saving mode, a paging message after signalling the early paging indication; and receiving, from the user equipment, an indication that the first measurements are available or an indication that measurement values previously signalled to the network access node are valid.

The apparatus may be caused to perform, prior to the user equipment entering the energy saving mode: signalling, to the user equipment, a second configuration for configuring the user equipment to perform second measurements for at least one of dual carrier operation and/or carrier aggregation operation.

The apparatus may be caused to perform: grouping the user equipment into a first group in dependence on a similarity of at least one capability or configuration of the user equipment to other user equipment in the first group.

The apparatus may be caused to perform: determining to configure the user equipment with the first reconfiguration information in dependence on a determination that: a number of user equipment currently being served by at least one cell and/or carrier being considered for dual carrier and/or carrier aggregation is above a first predetermined threshold, a current load of at least one cell and/or carrier being considered for dual carrier and/or carrier aggregation is above a second predetermined threshold, an availability of at least one cell and/or carrier being considered for dual carrier and/or carrier aggregation, and/or whether a determined service is supported by at least one cell and/or carrier being considered for dual carrier and/or carrier aggregation.

The apparatus may be caused to perform: signalling the first configuration to at least one access node controlling at least one of said plurality of cells.

The energy saving mode may be at least one of a radio resource control IDLE mode or a radio resource control INACTIVE mode.

The first configuration may comprise an instruction to perform at least one of the following for said configuring the user equipment for performing measurements: Stop performing any previously configured dual carrier and/or carrier aggregation measurement configuration; Start performing any previously configured dual carrier and/or carrier aggregation measurement configuration; Switch from obtaining measurements according to a first previously configured measurement configuration to obtaining measurements according to a second previously configured measurement configuration; Perform measurements using a higher or lower periodicity than a periodicity previously used to perform measurements; Perform measurements over a single carrier and/or cell; Stop performing any previously configured dual carrier and/or carrier aggregation measurement configuration after a preconfigured timer has expired; Continue performing any previously configured dual carrier and/or carrier aggregation measurement configuration after a preconfigured timer has expired; Store and/or erase measurements obtained using a previously configured dual carrier and/or carrier aggregation measurement configuration; or Determine a validity of at least one previously performed measurement.

Configuring the user equipment for performing measurements for a plurality of cells may be performed for configuring at least one of dual carrier operation or carrier aggregation operation.

The first configuration may comprise at least one of: a list of cells; a list of early paging indicators that maps to a list of cells; a list of paging occasions that maps to a list of cells; or an indication of a user equipment action to be performed when a measurement of at least one of said plurality of cells fulfils a predetermined condition.

According to a seventh aspect, there is provided an apparatus for a user equipment, the apparatus comprising: receiving signalling for receiving, from a serving network access node when the user equipment is in an energy saving mode, an early paging indication and first reconfiguration information, the first reconfiguration information comprising a first configuration for configuring the user equipment for performing measurements for a plurality of cells; performing circuitry for performing first measurements according to the first configuration when the user equipment is in the energy saving mode; and identifying and performing circuitry for, depending on the first measurements, identifying and performing at least one action.

The identifying and performing circuitry for identifying and performing at least one action may comprise causing circuitry for causing the first measurements to be reported by: receiving, from the serving network access node when the user equipment is in an energy saving mode, a paging message after receiving the early paging indication; signalling, to the serving network access node, an indication that the first measurements are available or an indication that measurement values previously signalled to the network access node are valid; transitioning to the connected mode after signalling said indication that the first measurements are available or the indication that measurement values previously signalled to the network access node are valid; and after said transitioning, signalling the first measurements to the serving network access node.

The apparatus may comprise, prior to entering the energy saving mode: receiving circuitry for receiving, from the serving network node, a second configuration for configuring the user equipment to perform second measurements for at least one of dual carrier operation and/or carrier aggregation operation; and, after entering the energy saving mode and before receiving the first configuration: performing circuitry for performing second measurements according to the second configuration until a timer associated with the second configuration expires or until the first measurements according to the first configuration are performed.

The apparatus may comprise providing circuitry for providing at least some of the second measurements to the serving network access node.

The at least one action may comprise: reporting the first measurements to the serving network access node, applying a candidate cell configuration related to the measured cell, or selecting and connecting to a cell for providing network access to the user equipment.

The energy saving mode may be at least one of a radio resource control IDLE mode or a radio resource control INACTIVE mode.

The first configuration may comprise an instruction to perform at least one of the following for said configuring the user equipment for performing measurements: Stop performing any previously configured dual carrier and/or carrier aggregation measurement configuration; Start performing any previously configured dual carrier and/or carrier aggregation measurement configuration; Switch from obtaining measurements according to a first previously configured measurement configuration to obtaining measurements according to a second previously configured measurement configuration; Perform measurements using a higher or lower periodicity than a periodicity previously used to perform measurements; Perform measurements over a single carrier and/or cell; Stop performing any previously configured dual carrier and/or carrier aggregation measurement configuration after a preconfigured timer has expired; Continue performing any previously configured dual carrier and/or carrier aggregation measurement configuration after a preconfigured timer has expired; Store and/or erase measurements obtained using a previously configured dual carrier and/or carrier aggregation measurement configuration; or Determine a validity of at least one previously performed measurement.

Configuring the user equipment for performing measurements for a plurality of cells may be performed for configuring at least one of dual carrier operation or carrier aggregation operation.

The first configuration may comprise at least one of: a list of cells; a list of early paging indicators that maps to a list of cells; a list of paging occasions that maps to a list of cells; or an indication of a user equipment action to be performed when a measurement of at least one of said plurality of cells fulfils a predetermined condition.

According to an eighth aspect, there is provided an apparatus for a serving network access node serving a user equipment, the apparatus comprising: signalling circuitry for signalling, to the user equipment when the user equipment is in an energy saving mode, an early paging indication and first reconfiguration information, the first reconfiguration information comprising a first configuration for configuring the user equipment to perform first measurements for a plurality of cells.

The apparatus may comprise receiving circuitry for receiving, from the user equipment when the user equipment is in a connected mode, the first measurements made in accordance with the first configuration and/or an indication of a cell selected by the user equipment for providing network access to the user equipment, or an indication of a candidate cell configuration related to the measured cell applied by the user equipment.

The apparatus may comprise: signalling circuitry for signalling, to the user equipment when the user equipment is in the energy saving mode, a paging message after signalling the early paging indication; and receiving, from the user equipment, an indication that the first measurements are available or an indication that measurement values previously signalled to the network access node are valid.

The apparatus may comprise, prior to the user equipment entering the energy saving mode: signalling circuitry for signalling, to the user equipment, a second configuration for configuring the user equipment to perform second measurements for at least one of dual carrier operation and/or carrier aggregation operation.

The apparatus may comprise: grouping circuitry for grouping the user equipment into a first group in dependence on a similarity of at least one capability or configuration of the user equipment to other user equipment in the first group.

The apparatus may comprise: determining circuitry for determining to configure the user equipment with the first reconfiguration information in dependence on a determination that: a number of user equipment currently being served by at least one cell and/or carrier being considered for dual carrier and/or carrier aggregation is above a first predetermined threshold, a current load of at least one cell and/or carrier being considered for dual carrier and/or carrier aggregation is above a second predetermined threshold, an availability of at least one cell and/or carrier being considered for dual carrier and/or carrier aggregation, and/or whether a determined service is supported by at least one cell and/or carrier being considered for dual carrier and/or carrier aggregation.

The apparatus may comprise: signalling circuitry for signalling the first configuration to at least one access node controlling at least one of said plurality of cells.

The energy saving mode may be at least one of a radio resource control IDLE mode or a radio resource control INACTIVE mode.

The first configuration may comprise an instruction to perform at least one of the following for said configuring the user equipment for performing measurements: Stop performing any previously configured dual carrier and/or carrier aggregation measurement configuration; Start performing any previously configured dual carrier and/or carrier aggregation measurement configuration; Switch from obtaining measurements according to a first previously configured measurement configuration to obtaining measurements according to a second previously configured measurement configuration; Perform measurements using a higher or lower periodicity than a periodicity previously used to perform measurements; Perform measurements over a single carrier and/or cell; Stop performing any previously configured dual carrier and/or carrier aggregation measurement configuration after a preconfigured timer has expired; Continue performing any previously configured dual carrier and/or carrier aggregation measurement configuration after a preconfigured timer has expired; Store and/or erase measurements obtained using a previously configured dual carrier and/or carrier aggregation measurement configuration; or Determine a validity of at least one previously performed measurement.

Configuring the user equipment for performing measurements for a plurality of cells may be performed for configuring at least one of dual carrier operation or carrier aggregation operation.

The first configuration may comprise at least one of: a list of cells; a list of early paging indicators that maps to a list of cells; a list of paging occasions that maps to a list of cells; or an indication of a user equipment action to be performed when a measurement of at least one of said plurality of cells fulfils a predetermined condition.

According to a ninth aspect, there is provided non-transitory computer readable medium comprising program instructions for causing an apparatus for a user equipment to perform: receiving, from a serving network access node when the user equipment is in an energy saving mode, an early paging indication and first reconfiguration information, the first reconfiguration information comprising a first configuration for configuring the user equipment for performing measurements for a plurality of cells; performing first measurements according to the first configuration when the user equipment is in the energy saving mode; and depending on the first measurements, identifying and performing at least one action.

The identifying and performing at least one action may comprise means for causing the first measurements to be reported by: receiving, from the serving network access node when the user equipment is in an energy saving mode, a paging message after receiving the early paging indication; signalling, to the serving network access node, an indication that the first measurements are available or an indication that measurement values previously signalled to the network access node are valid; transitioning to the connected mode after signalling said indication that the first measurements are available or the indication that measurement values previously signalled to the network access node are valid; and after said transitioning, signalling the first measurements to the serving network access node.

The apparatus may be caused to perform, prior to entering the energy saving mode: receiving, from the serving network node, a second configuration for configuring the user equipment to perform second measurements for at least one of dual carrier operation and/or carrier aggregation operation; and, after entering the energy saving mode and before receiving the first configuration: performing second measurements according to the second configuration until a timer associated with the second configuration expires or until the first measurements according to the first configuration are performed.

The apparatus may be caused to perform providing at least some of the second measurements to the serving network access node.

The apparatus may be caused to perform: reporting the first measurements to the serving network access node, applying a candidate cell configuration related to the measured cell, or selecting and connecting to a cell for providing network access to the user equipment.

The energy saving mode may be at least one of a radio resource control IDLE mode or a radio resource control INACTIVE mode.

The first configuration may comprise an instruction to perform at least one of the following for said configuring the user equipment for performing measurements: Stop performing any previously configured dual carrier and/or carrier aggregation measurement configuration; Start performing any previously configured dual carrier and/or carrier aggregation measurement configuration; Switch from obtaining measurements according to a first previously configured measurement configuration to obtaining measurements according to a second previously configured measurement configuration; Perform measurements using a higher or lower periodicity than a periodicity previously used to perform measurements; Perform measurements over a single carrier and/or cell; Stop performing any previously configured dual carrier and/or carrier aggregation measurement configuration after a preconfigured timer has expired; Continue performing any previously configured dual carrier and/or carrier aggregation measurement configuration after a preconfigured timer has expired; Store and/or erase measurements obtained using a previously configured dual carrier and/or carrier aggregation measurement configuration; or Determine a validity of at least one previously performed measurement.

Configuring the user equipment for performing measurements for a plurality of cells may be performed for configuring at least one of dual carrier operation or carrier aggregation operation.

The first configuration may comprise at least one of: a list of cells; a list of early paging indicators that maps to a list of cells; a list of paging occasions that maps to a list of cells; or an indication of a user equipment action to be performed when a measurement of at least one of said plurality of cells fulfils a predetermined condition.

According to a tenth aspect, there is provided non-transitory computer readable medium comprising program instructions for causing an apparatus for a serving network access node serving a user equipment to perform: signalling, to the user equipment when the user equipment is in an energy saving mode, an early paging indication and first reconfiguration information, the first reconfiguration information comprising a first configuration for configuring the user equipment to perform first measurements for a plurality of cells.

The apparatus may be caused to perform receiving, from the user equipment when the user equipment is in a connected mode, the first measurements made in accordance with the first configuration and/or an indication of a cell selected by the user equipment for providing network access to the user equipment, or an indication of a candidate cell configuration related to the measured cell applied by the user equipment.

The apparatus may be caused to perform: signalling, to the user equipment when the user equipment is in the energy saving mode, a paging message after signalling the early paging indication; and receiving, from the user equipment, an indication that the first measurements are available or an indication that measurement values previously signalled to the network access node are valid.

The apparatus may be caused to perform, prior to the user equipment entering the energy saving mode: signalling, to the user equipment, a second configuration for configuring the user equipment to perform second measurements for at least one of dual carrier operation and/or carrier aggregation operation.

The apparatus may be caused to perform: grouping the user equipment into a first group in dependence on a similarity of at least one capability or configuration of the user equipment to other user equipment in the first group.

The apparatus may be caused to perform: determining to configure the user equipment with the first reconfiguration information in dependence on a determination that: a number of user equipment currently being served by at least one cell and/or carrier being considered for dual carrier and/or carrier aggregation is above a first predetermined threshold, a current load of at least one cell and/or carrier being considered for dual carrier and/or carrier aggregation is above a second predetermined threshold, an availability of at least one cell and/or carrier being considered for dual carrier and/or carrier aggregation, and/or whether a determined service is supported by at least one cell and/or carrier being considered for dual carrier and/or carrier aggregation.

The apparatus may be caused to perform: signalling the first configuration to at least one access node controlling at least one of said plurality of cells.

The energy saving mode may be at least one of a radio resource control IDLE mode or a radio resource control INACTIVE mode.

The first configuration may comprise an instruction to perform at least one of the following for said configuring the user equipment for performing measurements: Stop performing any previously configured dual carrier and/or carrier aggregation measurement configuration; Start performing any previously configured dual carrier and/or carrier aggregation measurement configuration; Switch from obtaining measurements according to a first previously configured measurement configuration to obtaining measurements according to a second previously configured measurement configuration; Perform measurements using a higher or lower periodicity than a periodicity previously used to perform measurements; Perform measurements over a single carrier and/or cell; Stop performing any previously configured dual carrier and/or carrier aggregation measurement configuration after a preconfigured timer has expired; Continue performing any previously configured dual carrier and/or carrier aggregation measurement configuration after a preconfigured timer has expired; Store and/or erase measurements obtained using a previously configured dual carrier and/or carrier aggregation measurement configuration; or Determine a validity of at least one previously performed measurement.

Configuring the user equipment for performing measurements for a plurality of cells may be performed for configuring at least one of dual carrier operation or carrier aggregation operation.

The first configuration may comprise at least one of: a list of cells; a list of early paging indicators that maps to a list of cells; a list of paging occasions that maps to a list of cells; or an indication of a user equipment action to be performed when a measurement of at least one of said plurality of cells fulfils a predetermined condition.

According to an eleventh aspect, there is provided a computer program product stored on a medium that may cause an apparatus to perform any method as described herein.

According to a twelfth aspect, there is provided an electronic device that may comprise apparatus as described herein.

According to a thirteenth aspect, there is provided a chipset that may comprise an apparatus as described herein.

BRIEF DESCRIPTION OF FIGURES

Some examples, will now be described, merely by way of illustration only, with reference to the accompanying drawings in which.

DETAILED DESCRIPTION

The following describes operations that may be performed for making measurements for determining a carrier aggregation (CA) and/or Dual-Connectivity (DC) operation.

In reference to this, mention is made to Primary Secondary Cells (PSCells), Primary Cells (PCells), and Secondary Cells (SCells). The following will outline features of PSCells in relation to 5G New Radio, using terminology used therein. However, it is understood that the presently described principles are not limited to such terminology, and may be applied to other systems having a similar architecture. For example, in multi-radio-dual connectivity (MR-DC), a Primary Cell (PCell) may be a Long Term Evolution (LTE) cell (e.g., Evolved-Universal Terrestrial Radio Access-New Radio-dual connectivity (EN-DC)).

PSCells are a type of cell currently defined in 5G New Radio, along with Primary Cells (PCells), Secondary Cells (SCells) and Special Cells (SpCells). A PCell may be used as part of an initial access between a UE and an access network, and is considered to be a main cell in a master cell group (MCG). A PSCell may be comprised as part of a secondary cell group (SCG). The SpCells and SCells may be in at least one of the MCG and the SCG.

The cells may be controlled by network nodes. There are two different types of network nodes in 5G New Radio: Master nodes (which provide a control plane connection to a core network); and Secondary Nodes (which do not have control plane connections to the core network). The Master and Secondary nodes may both provide user plane (e.g. data) connections to the core network. The Master node may control the PCell. In addition to the PCell, the Master node may control at least one PSCell, although this is not always the case. The Secondary node may control at least one PSCell.

There may further comprise an interface between the different nodes, depending on the dual connectivity option. An X2 interface is an interface between eNBs in LTE that may be reused between Radio Access Network (RAN) nodes in non-standalone operation (e.g., between an eNB and an en-gNB). The Xn interface is an interface between RAN nodes in operating in a standalone operation (e.g., between an ng-eNB and an ng-eNB/gNB and between a gNB/ng-eNB and an gNB).

Further reference in the below is made to Frequency Range 1 (FR1) and Frequency Range 2 (FR2). FR1 and FR2 are two main frequency ranges for the fifth generation (5G) of mobile technology. FR1 comprises sub-6 GHz frequency bands, some of which are traditionally used by previous standards, but has been extended to cover potential new spectrum offerings from 410 MHz to 7125 MHz. FR2 comprises frequency bands from 24.25 GHz to 71.0 GHz.

Before describing in detail the examples, certain general principles of a 5G wireless communication system are briefly explained with reference to FIGS. 1A and 1B.

Figure 1A:
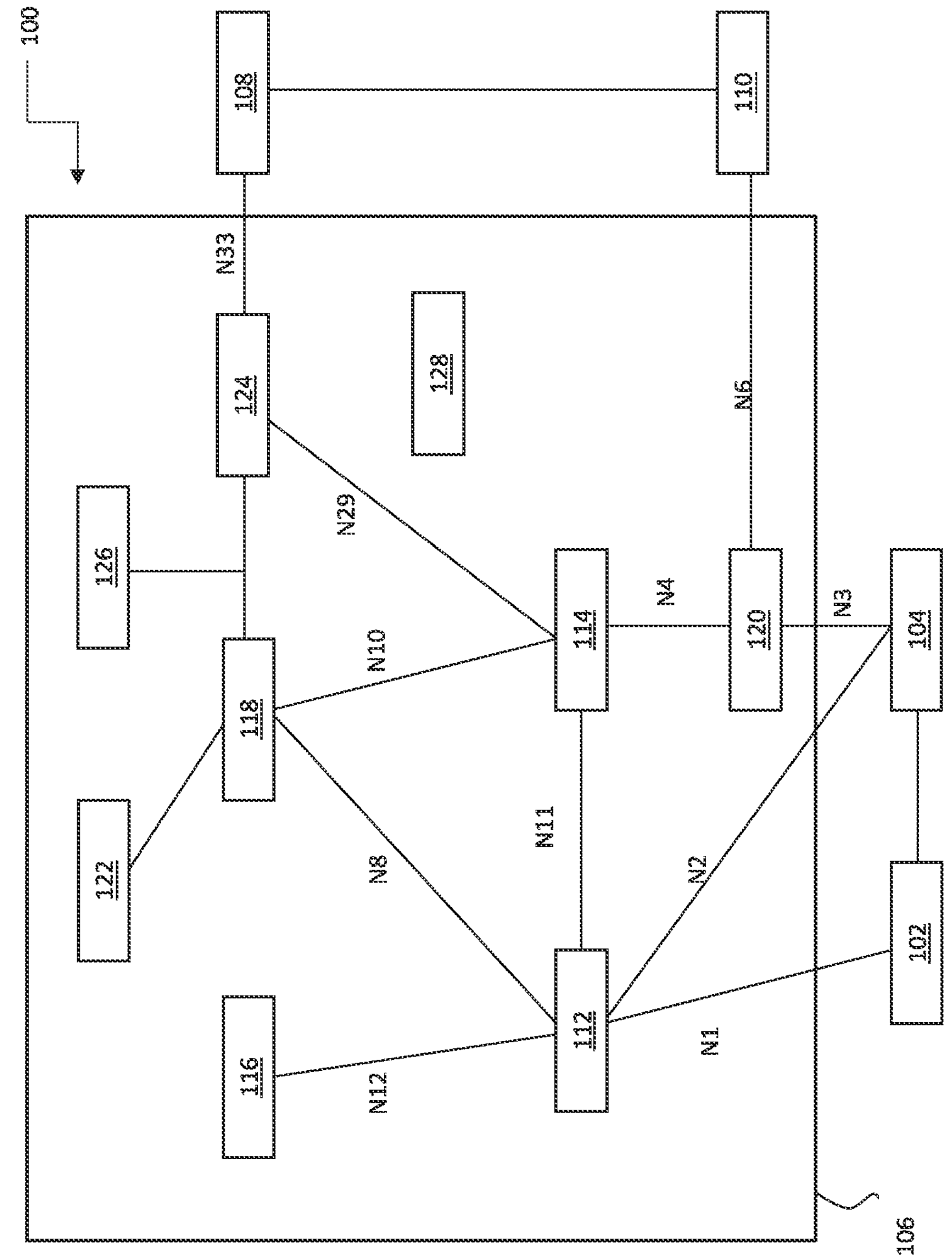
FIGS. 1A and 1B show a schematic representation of a 5G system.

FIG. 1A shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N31WF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access and Mobility Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. The role of an NEF is to provide secure exposure of network services (e.g. voice, data connectivity, charging, subscriber data, and so forth) towards a 3rd party. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The network may further comprise a management data analytics service (MDAS) producer or MDAS Management Service (MnS) producer. The MDAS MnS producer may provide data analytics in the management plane considering parameters including, for example, load level and/or resource utilization. For example, the MDAS MnS producer fora network function (NF) may collect the NF's load-related performance data, e.g., resource usage status of the NF. The analysis of the collected data may provide forecast of resource usage information in a predefined future time window. This analysis may also recommend appropriate actions e.g., scaling of resources, admission control, load balancing of traffic, and so forth.

Figure 1B:
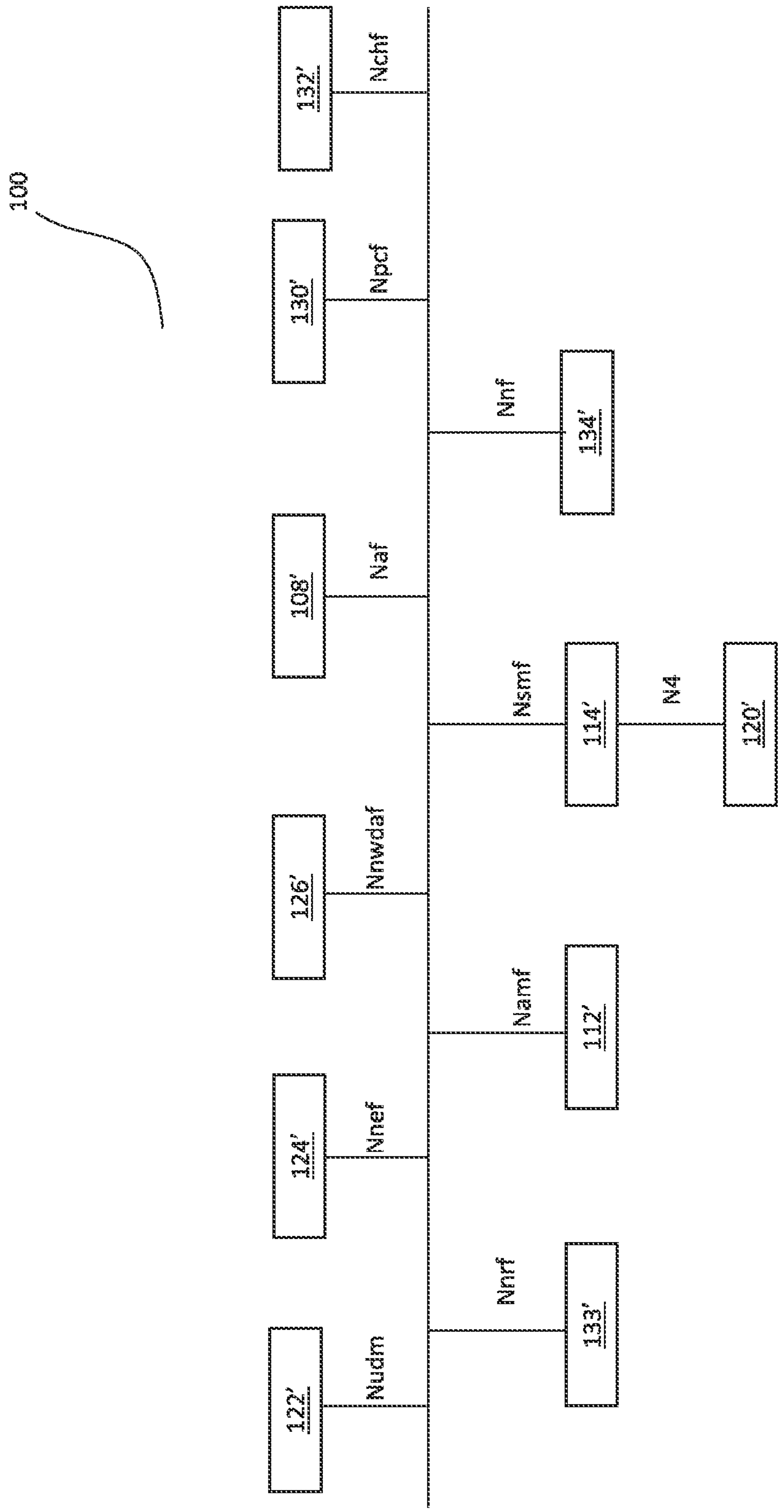

FIG. 1B shows a schematic representation of a 5GC represented in current 3GPP specifications. It is understood that this architecture is intended to illustrate potential components that may be comprised in a core network, and the presently described principles are not limited to core networks comprising only the described components.

FIG. 1B shows a 5GC 106' comprising a UPF 120' connected to an SMF 114' over an N4 interface. The SMF 114' is connected to each of a UDM 122', an NEF 124', an NWDAF 126', an AF 108', a Policy Control Function (PCF) 130', an AMF 112', and a Charging function 132' over an interconnect medium that also connects these network functions to each other. The 5G core 106' further comprises a network repository function (NRF) 133' and a network function 134' that connect to the interconnect medium.

3GPP has issued a number of releases (Rel) for defining operating communication protocols related to a communications network. Currently, objectives and work are being set in relation to Release 18 (Rel. 18).

As mentioned above, Conditional PSCell addition (CPA) and Conditional PSCell change (CPC) were standardized in 3GPP Rel-16 and Rel-17 following a similar approach of Conditional HandOver (CHO) that was standardized in 3GPP Rel-16.

The basic functionality of PSCell addition and PSCell change is to enable a UE to respectively establish or change a secondary radio link to a cell of a secondary cell group (SCG) for dual connectivity purposes. The details on these procedures may be read from TS 37.340 and TS 38.331 for both Rel-16 and Rel-17.

A Release-18 Work Item ("Further NR Mobility Enhancements" work item) described that a primary objective would be to study a Frequency Range 2 (FR2) Secondary Cell Group/Secondary cell (SCG/SCell) measurement acquisition procedures. FR2 frequencies comprise transmissions made in mm-wave frequencies. Such studies would be useful for investigating potential enhancements and mechanisms for improving dual carrier and/or carrier aggregation (DC and/or CA) and for improving FR2 DC/CA setup/resume delays for a UE connecting from an IDLE and/or INACTIVE mode.

A recent 3GPP meeting further agreed to study measurement enhancements in IDLE/INACTIVE mode relative to Release-16 measurements, measurement enhancements that may be made when a UE is about to enter a connected mode, and the feasibility of making improvements to an FR2 SCell/SCG setup delay.

To compensate for the additional propagation path-loss nature of transmission in mm-wave frequencies (e.g., FR2), gNBs may be equipped with a relatively high number of antenna elements, where signals are beamformed and transmitted through different spatial filtered narrow beams.

On the UE-side, in order to provide full special coverage in FR2, devices are expected to be equipped with multiple directional antenna panels (Receive/Transmit beams) located, for example, at different side of device, each covering part of the space. This is different to the architecture used for FR1 systems in which devices are mostly built with a single antenna panel (with spherical coverage).

Generally, initial connection establishment procedures comprise cell detection and/or cell measurement operations. In NR networks, initial connection establishment procedure and beam selection phase are performed by measuring Synchronization Signal Blocks (SSBs) broadcasted from an access point/gNB through different spatial filters that are multiplexed and swept in the TDM manner.

In NR FR2 architectures, due to an assumption regarding multiple UE panels (in general directional receive and transmit), the UE cell detection and measurement time is relaxed compared to FR1. Currently, it is assumed that the user can receive from one receive panel (i.e., from one spatial direction) at a time. Therefore, to measure a cell/carrier frequency properly, the UE is assumed to consecutively measure the reference signals by sweeping its receive panels. This can result in additional measurement time compared to that required for FR1 single panel users.

To improve the user throughput as well as data transmission latency (e.g., reducing packet queuing/buffering delay), and reliability, it is useful to reduce secondary link establishment/resume delay(s) for Primary Secondary Cell (PSCell) and/or SCell setup in DC/CA operation scenarios. This is especially useful for a UE connecting from IDLE/INACTIVE modes, where network information is limited as a result of the connecting UE's available measurements from the IDLE/INACTIVE mode.

To setup a DC/CA connection, the UE measures, and report configured inter-frequency carriers. It has been shown that measurement acquisition delay is a primary component contributing to DC/CA setup delay. For example, using values provided in TS 38.133 for a connected-mode UE measurement requirement, a measurement acquisition delay may be of the order of 4000 msec.

To avoid such a high delay especially for a UE connecting from IDLE/INACTIVE mode, Early measurement reporting (EMR) was proposed in NR Rel-16 to enable faster DC/CA setup by configuring the UE to perform IDLE-mode measurements on potential DC/CA frequencies/cells while a specific timer (labelled as a T331 timer) is running. The UE prepares a report on these measurements and send it to the network once entering the RRC-connected mode. The IDLE-mode and/or INACTIVE-mode measurements may be used for DC/CA cell measurement, cell selection, and/or cell setup. This mechanism resolves the need for connected-mode measurements. After T331 expiry, it is up to the UE implementation whether to continue making measurements or not.

For example, a UE may perform early measurement reporting (EMR) measurements or IDLE/INACTIVE measurements as defined in TS 38.331, while a timer (e.g., a T331 timer) is running. This early measurement reporting consumes UE's battery power.

Currently, a network node, e.g., a gNB, can configure a UE to perform EMR measurements in advance of the UE transiting from a higher-power consuming radio resource control (RRC) mode (e.g., RRC_CONNECTED) to a lower power consuming RRC mode (e.g., INACTIVE, IDLE, etc.) and when the T331 timer is still running which may still cause unnecessary power consumption.

In some example architectures, the T331 timer may be started upon receiving a radio resource control release message (e.g., an RRCRelease service operationmessage comprising a "measIDLEDuration" Information element) from the network node. When the T331 timer is running, the UE may perform measurements (for example, according to an early measurement reporting configuration, e.g., VarMeasIDLEConfig). The T331 timer may be stopped by the UE upon the UE receiving any of an RRCSetup, RRCResume, or RRCRelease service operation message comprising an IDLE/INACTIVE measurement configuration, upon reselecting to cell that does not belong to the validity area (if configured), or upon cell re-selection to another radio access technology (RAT). When the T331 timer expires (or stopped), the UE may release the early measurement reporting configuration (e.g., VarMeasIDLEConfig).

For example, in wireless networks, a network node (e.g., gNB/eNB) may request a UE to measure New Radio (NR) and/or Evolved-Universal Terrestrial Radio Access (E-UTRA) carriers in INACTIVE/IDLE modes via system information (SI) or dedicated measurement configuration in an RRC Release message. When a UE is configured to perform measurements of NR/E-UTRA carriers while the UE is in an IDLE mode, these measurements may provide an indication of the availability of corresponding measurement results to the network in an RRCSetupComplete message.

The network may request the UE to report the measurements after security activation (illustrated below with reference to FIG. 7). The request for the measurements may be sent by the network immediately after transmitting the Security Mode Command (e.g., before the reception of the Security Mode Complete from the UE). However, when a UE is configured to perform measurements of NR/E-UTRA carriers while the UE is in an INACTIVE mode, the network may request the UE to provide corresponding measurement results in an RRCResume message and then the UE may include the available measurement results in an RRCResumeComplete message. Alternatively, the UE may provide an indication of the availability of the measurement results to the network in the RRCResumeComplete message and the network may then request the UE to provide these measurement results.

When a UE in an RRC_CONNECTED mode transitions to an RRC_INACTIVE or RRC_IDLE mode, the UE may collect early measurement reporting measurements when the UE is in INACTIVE/IDLE mode and when the T331 timer is running and report the measurements to the network once the UE transitions to RRC_CONNECTED mode. Therefore, there is a desire and/or need to collect EMR measurements and report the EMR measurements.

EMR measurement time requirement details in IDLE/INACTIVE mode according to 3GPP 38.133.

TABLE 1

Tdetect, NR_Inter, Tmeasure, NR_Inter and Tevaluate, NR_Inter

| DRX cycle length [s] | Scaling Factor (N1) FR1 | FR2[Note1] | $T_{detect,NR\_Inter}$ [s] (number of DRX cycles) | $T_{measure,NR\_Inter}$ [s] (number of DRX cycles) | $T_{evaluate,NR\_Inter}$ [s] (number of DRX cycles) |
|---|---|---|---|---|---|
| 0.32 | 1 | 8 | 11.52 × N1 × 1.5 (36 × N1 × 1.5) | 1.28 × N1× 1.5 (4 × N1 × 1.5) | 5.12 × N1 × 1.5 (16 × N1 × 1.5) |
| 0.64 | | 5 | 17.92 × N1 (28 × N1) | 1.28 × N1 (2 × N1) | 5.12 × N1 (8 × N1) |
| 1.28 | | 4 | 32 × N1 (25 × N1) | 1.28 × N1 (1 × N1) | 6.4 × N1 (5 × N1) |
| 2.56 | | 3 | 58.88 × N1 (23 × N1) | 2.56 × N1 (1 × N1) | 7.68 × N1 (3 × N1) |

Note 1:
Applies for UE supporting power class 2 & 3 & 4. For UE supporting power class 1 or 5, N1 = 8 for all Discontinuous cycle length.

Based on the above description and assuming one inter-frequency carrier, and DRX cycle length of 320 msec, the delay requirement including cell detection and cell measurement times equals:

$T_{detect,NR\_Inter}+T_{measure,NR\_Inter}=(36*8*1.5+4*8*1.5)*320=153600$ msec for an FR2 carrier frequency.

There is also ongoing study in 3GPP to define improved measurement procedures for UEs that do not supporting EMR or for UEs with EMR when timer T331 has expired and measurements are not available, valid or applicable for the present mechanism. In such a case, the UE may trigger improved/enhanced measurements during Radio Resource Control-(RRC-) IDLE/and/or INACTIVE modes, and, depending on the measurement requirement time, these measurements may continue during an RRC transition period (e.g., when switching from RRC-IDLE/INACTIVE mode to an RRC-connected mode), and during RRC-connected stage.

Figure 6A:
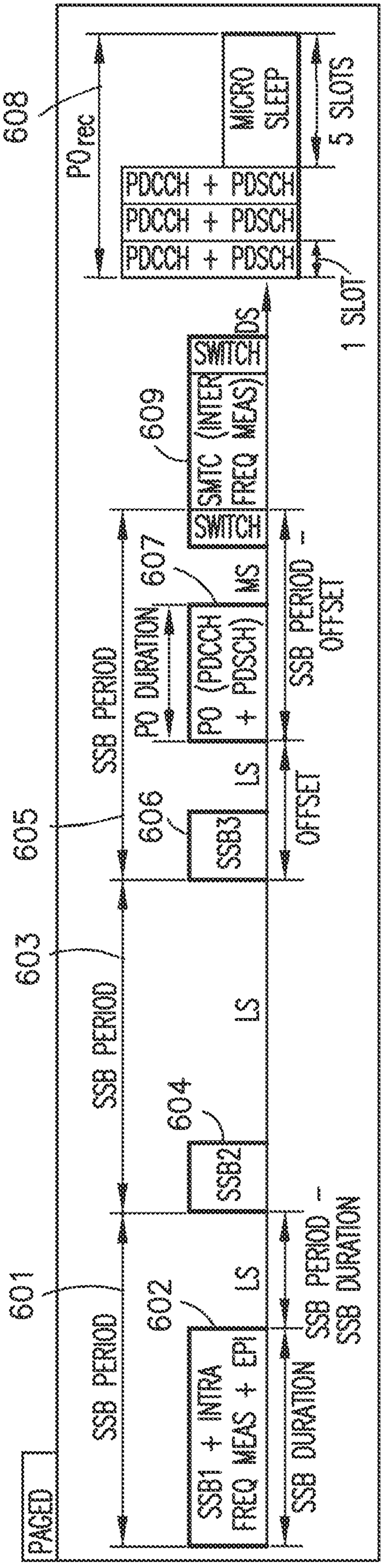
FIGS. 6A and 6B illustrate paging operations.
Figure 6B:
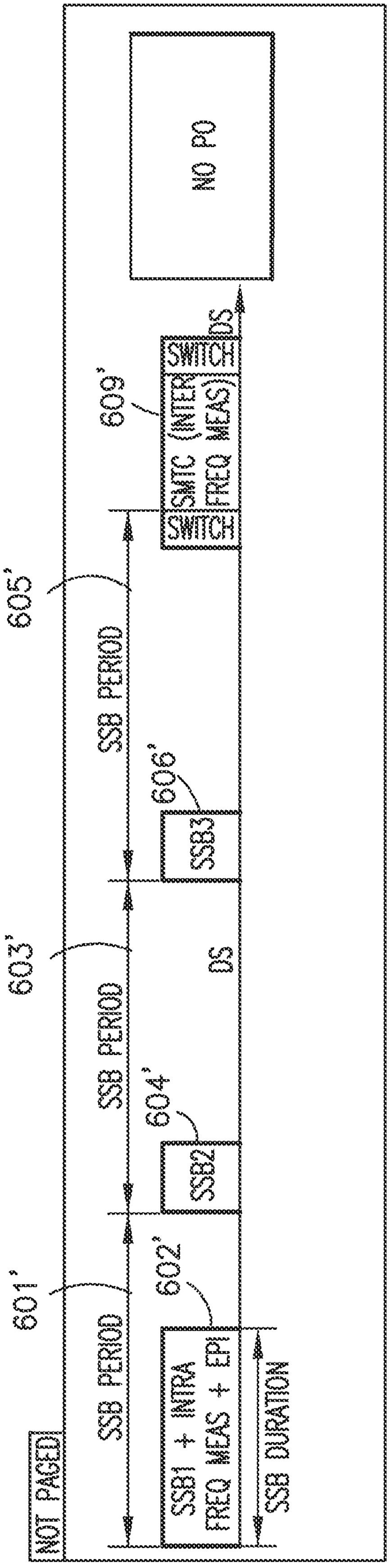

Release-17 introduced Early Paging Indicator (EPI). EPI was introduced in NR Rel-17 as an enhancement for UE power saving operations. Under this mechanism, the network informs a UE in advance of a paging occasion (PO) whether the UE has to monitor the PO or not using an EPI message. The UE may use this information to determine whether to prepare for paging reception or not. An EPI message can be signalled in the Physical Downlink Control Chanel (PDCCH) or through a Reference Signal (RS) transmission, e.g., Secondary synchronization Signal. Simulation results shows that use of EPI may contribute to between 17 to 34% UE energy saving during IDLE/INACTIVE mode compared to mechanisms that do not use EPI. An example of DCI-based early paging indication is illustrated with reference to FIGS. 6A and 6B. In FIGS. 6A and 6B, LS labels a duration in which the UE is operating in a light sleep state, DS labels a duration in which the UE is operating in a deep sleep state, and MS labels a duration in which the UE is operating in a micro sleep state.

FIG. 6A illustrates operations (and their potential timings) that may be performed when a UE is paged for measurement information in Downlink Control Information-based (DCI-based) early paging indication signalling.

During a first synchronization block signal (SSB) period 601, a first synchronization signal block 602 is received, during which the UE performs an intra-frequency measurement and receives an EPI.

During a second SSB period 603, a second SSB 604 is received. During a third SSB period 605, a third SSB 606 is received, along with a paging occasion 607. The paging occasion may be received on at least one of a Physical Downlink Control Channel (PDCCH), and a Physical Downlink Shared Channel (PDSCH). An example structure of the paging occasion is illustrated at 608.

During 609, the UE performs an SSB-based Measurement Timing Configuration (SMTC) inter-frequency measurement.

FIG. 6B illustrates operations (and their potential timings) that may be performed when a UE is not paged for measurement information when the UE is configured with Downlink Control Information-based (DCI-based) early paging indication signalling.

During a first synchronization block signal (SSB) period 60'1, a first synchronization signal block 602' is received, during which the UE performs an intra-frequency measurement and receives an EPI.

During a second SSB period 603', a second SSB 604' is received. During a third SSB period 605', a third SSB 606' is received. No paging occasion is received during 605'.

During 609', the UE performs an SMTC inter-frequency measurement.

Sub-grouping is another interesting feature of EPI. Due to many UEs may share the same PO, a false paging alarm rate may be high. Sub-grouping enables a network to divide UEs of one PO in N sub-groups in order to minimize the false paging alarm.

There are a number of different issues associated with current mechanisms for enabling efficiencies.

For example, legacy UE behaviour is to start EMR measurement after receiving the RRCRelease message (going to IDLE/INACTIVE mode) and continue the measurement while T331 is running. It is left up to the UE implementation whether to continue the measurement after timer expiry or not.

One of the main motivations for the network to initiate DC/CA setup is to off-load traffic from the main serving cell (Pcell)/carrier when it is overloaded with uplink and/or downlink transmissions. In this scenario, the network may configure DC/CA capable devices to perform inter-carrier measurements when those devices are operating in an IDLE/INACTIVE mode such that when transitioning to RRC-Connected, those devices can be served by additional resources provided by a Pscell and/or an Scell. In a such case, following scenarios may happen.

First when the Pcell is overloaded and configures UEs to perform EMR (DC/CA) measurements, after some time, the Pcell may become less congested and so can serve the UEs through its carrier. In this case, it would be beneficial to inform IDLE/INACTIVE UEs to stop performing EMR to save power.

Second, when the Pcell is not overloaded and does not trigger UEs to perform EMR, the Pcell may later it become overloaded. In such a case, it would be advantageous to trigger UEs to perform EMR measurement.

Third, the network may have configured UEs with multiple EMR carriers/cells to report on, and one of those carriers may later become congested. In such a case, it would be advantageous for the network inform UEs to stop measuring that carrier/cell.

Fourth, the network may want a UE to perform measurements according to an improved and/or enhanced measurement mechanism (e.g., in accordance with proposals to be made in Rel. 18) instead of a current measurement mechanism (e.g., Rel16-EMR measurement).

Fifth, the network may want a UE to perform validations of previously performed measurements (e.g., measurements of an EMR or measurement performed before switching to the IDLE and/or INACTIVE mode). For example, the network may provide a UE with conditions on when the UE is to perform the validity of previous measurements. Validity conditions may be defined in dependence on at least one (or a combination) of the following factors:

- A UE location and/or mobility status during the previous measurements and after timer expiry (e.g., static UE, low mobility UE, normal mobility UE, high mobility UE, etc., with the thresholds for each category being defined by a network and/or network operator);
- A timer length of the UE and channel variations (including cell and beam switches) that occurred during the previous measurement;
- UE location with respect to the DC/CA measured cell;
- Time gap between timer expiry (i.e., last EMR measurement of that cell/carrier) and validity measurement;
- Service requirement (e.g, Enhanced Mobile Broadband (eMBB), Extended Reality (XR), Ultra-Reliable low latency communication (URLLC)). The service requirements may be derived, for example, based on a 5G Quality of Service Identifier (5QI) or Data Radio Bearer (DRB) type, or associated slice information;
- A measurement difference (e.g., a measured Reference Signal Received Power (RSRP) difference) between the best measured cell/carrier and at least one other detected/measured cell/carrier; and
- A Cell quality (e.g., number of measured beams above a predetermined threshold).

Validity measurement configuration(s) and potential validity condition(s) may comprise at least one of the following definitions for a measurement configuration of the relevant downlink reference signal(s) to be used for validity measurements:

- A measurement validity type (e.g., a cell quality, a beam measurement, etc.). The measurement validity type may also be selected implicitly based on measurement configuration (e.g., Channel Status Information-Reference Signal (CSI-RS) or Synchronization Signal Block (SSB)-based);
- A number of new measurements to be performed, at least one duration in which to perform new measurements, and an accuracy for the new measurements to be achieved;
- How to perform the new measurement(s), measurement resources to be used for the new measurements, and a filtering configuration to be used for the new measurement(s);
- Scaling factors and number of samples for the new measurement.
- A measurement validity threshold (e.g., Reference Signal Received Power (RSRP) threshold) between previous measurements and measurements performed for validation for triggering the new measurements to be performed; and
- A validity type (e.g., location based, measurement based, combination of both, etc.).

Paging is one mechanism that has been defined on how to trigger/modify IDLE/INACTIVE mode measurements. After receiving the paging message, it takes around 40-100 msec for the UE to transit from RRC-IDLE/INACTIVE to RRC-connected mode which, in some cases, is not enough to perform FR2 measurement.

The following aims to address at least one of the above-mentioned issues.

In particular, the following aims to facilitate triggering of modifying DC/CA measurements while the UE is in an IDLE mode and/or an INACTIVE mode. Such mechanisms may result in enhanced measurement performance (which may be useful, for example, during DC/CA Setup), and may help facilitate lower UE power consumption.

The following focuses on providing enhancements on EPI that improves DC/CA measurements. These enhancements may include Rel-16 EMR mechanisms, Rel-18 enhanced measurement mechanisms, and/or improved Rel-16 EMR mechanisms (e.g., as described in relation to Rel-18). The network may improve DC/CA measurements by sending an EPI with supplementary information.

For example, EPI behaviour may be extended to comprise an inter-frequency (DC/CA) measurement configuration, such that the UE could skip IDLE/INACTIVE mode inter-frequency measurement.

The supplementary information regarding DC/CA measurement may be comprised in the EPI message in any of a plurality of different forms. For example, the supplementary information may comprise an instruction to perform at least one of the following:

- Stop DC/CA (e.g., EMR) measurement;
- Start DC/CA (e.g., EMR) measurement;
- Switch between different configured measurements (i.e, EMR-Rel16, Rel-18 enhanced measurement);
- Perform relaxed IDLE/INACTIVE measurements;
- Perform measurement with higher periodicity (i.e. lower DRX values);
- Perform measurement over one (selected) of DC/CA carriers or PSCell and SCells;
- Continue/Stop measurement after T331 expiry;
- Store/erase IDLE/INACTIVE mode measurements;
- Measurement validation; and/or
- Measurement and/or measurement validation over additional assisting reference signals.

Figure 7:
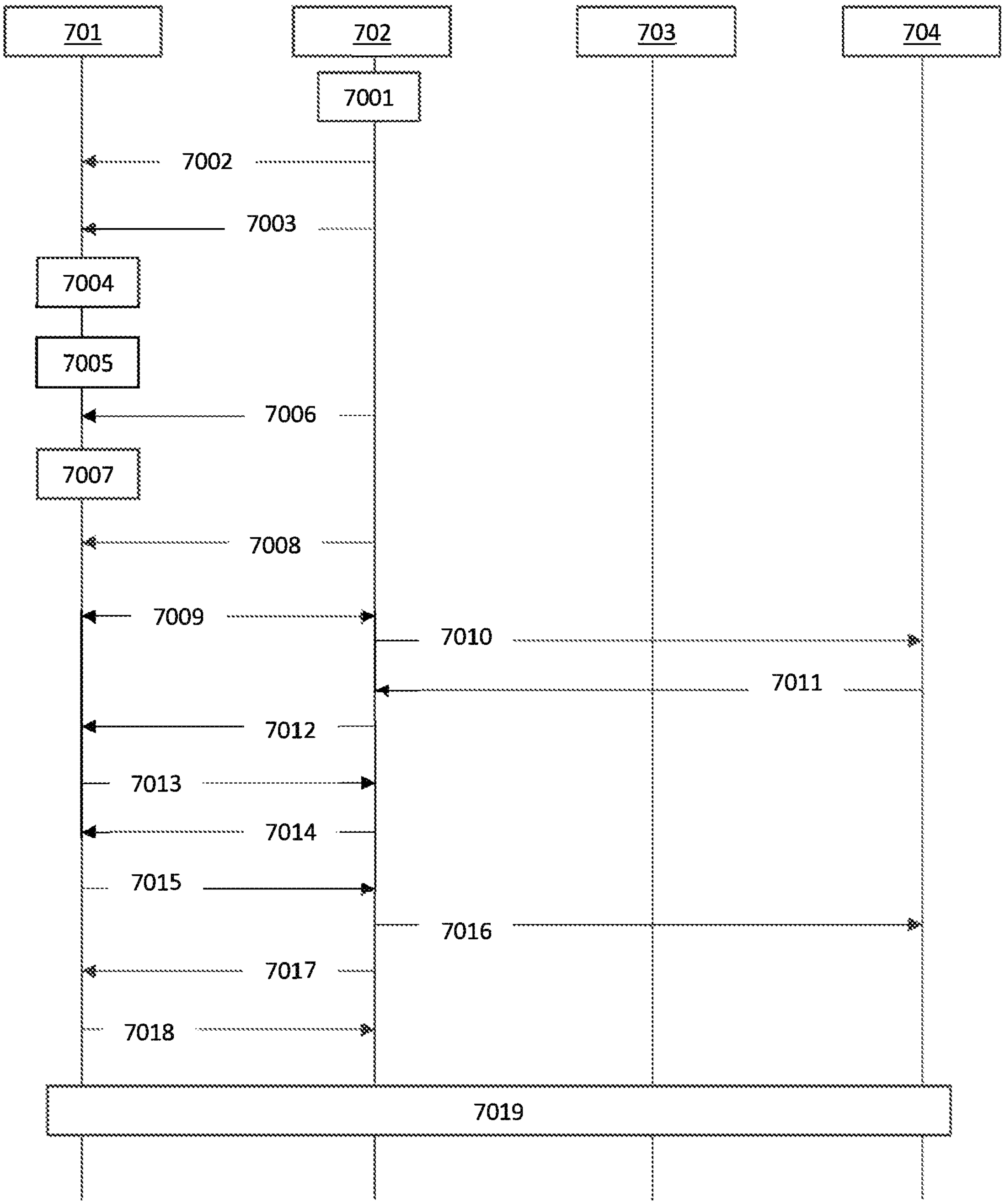
FIG. 7 illustrates example signalling between apparatus described herein.

FIG. 7 illustrates example signalling that may be performed between apparatus described herein. Although FIG. 7 is discussed in terms of a UE operating in an IDLE mode, it is understood that the presently described mechanisms may also be applied in respect of a UE operating in an INACTIVE mode.

FIG. 7 illustrates signalling that may be performed between a UE 701, an MN 702, a candidate SN 703, and an AMF 704.

During 7001, the MN 702 sorts a plurality of devices configured to operate using DC/CA into groups. These plurality of devices may called "DC/CA" devices. The plurality of devices may comprise at least the UE 701. Although not shown in FIG. 7, it is understood that other DC/CA devices in the plurality of devices may also operate in the same way as described below in relation to UE 701.

The sorting of 701 may be performed in dependence on at least one of a plurality of different factors. For example, this sorting may be performed in dependence on at least one service requirement of the device(s), a mobility pattern of the device(s), etc. The grouping may be performed such that devices having similar properties are grouped together. The thresholds defining to which group a specific device belongs may be predefined, or may be defined in consideration of the current set of devices being placed in their groups.

During 7002, the MN 702 signals the UE 701. This signalling may comprise DC/CA measurement configurations to be used by the UE 701 when the UE 701 is operating in an IDLE mode. For example, the signalling of 7002 may comprise measurement configurations in respect of EMR, enhanced DC/CA measurement, and/or improved measurement validation.

The signalling of 7002 may comprise configurations and conditions on how DC/CA measurements and/or validations are to be selected and/or performed when receiving an DC/CA indication through an EPI message. This indication may be provided as an addition of bits to an at least one existing EPI structure in order to preserve EPI structure and efficiency. The indication may be provided implicitly or explicitly.

The indication to measure specific frequency carrier, PSCell or PCell may additionally or alternatively be indicated through a mapping to the paging occasions.

During 7003, the MN 702 signals the UE 701. This signalling may comprise a Radio Resource Control (RRC) release instruction.

During 7004, the UE 701, following the signalling of 7003, the UE enters an RRC IDLE mode.

During 7005, the UE 701 performs measurements for DC/CA purposes (when configured to perform these measurements).

During 7006, the MN 702 signals the UE 701. This signalling may comprise supplementary information on supplementary DC/CA measurement configuration. This signalling may be provided through an EPI message. The supplementary information may be based on current Pcell and/or PScell and/or Scell conditions. For example, the supplementary information may be based on, for example, a number of UEs currently being served by at least one of the PCell and PSCell(s) and/or SCell(s) being considered, a current load of at least one of the PCell and PSCell(s) and/or SCell(s) being considered, an availability of the at least one of the PCell and PSCell(s) and/or SCell(s) being considered, services supported by at least one of the PCell and PSCell(s) and/or SCell(s) being considered, etc.

For example, the supplementary information may comprise an instruction to perform at least one of the following:

- Stop DC/CA (e.g., EMR) measurement;
- Start DC/CA (e.g., EMR) measurement;
- Switch between different configured measurements (i.e, EMR, enhanced measurement, measurement validation);
- Perform relaxed IDLE/INACTIVE measurements;
- Perform measurement with higher periodicity (i.e. lower DRX values);
- Perform measurement over one (selected) of DC/CA carriers or PSCell and SCells;
- Continue/Stop measurement after T331 expiry;
- Store/erase IDLE/INACTIVE mode measurements;
- Perform measurement validation; and/or
- Perform measurement and/or measurement validation over additional assisting reference signals The time when the EPI is signalled may be determined by taking into account how much time UE needs to collect measurements or validate measurements to find a good PSCell or SCell before answering the paging message transmitted by the MN 702.

During 7007, the UE 701 updates the DC/CA measurement configuration based on the received EPI information of 7006.

During 7008, the MN 702 signals a paging message to the UE 701. This paging message may indicate that downlink traffic is available for the UE 701.

During 7009, the UE 701 and MN 702 exchanges signalling. This signalling may be for causing the UE to initiate transitioning from the IDLE and/or INACTIVE mode to a CONNECTED mode. This may be initiated by the UE triggering a Random Access procedure. During the procedure the UE sends the RRC Setup Complete message to the network, which may comprise an indication of the modified DC/CA measurement availability or validity.

During 7010, the MN 702 signals the AMF 704. This signalling may comprise a first non access stratum (NAS) message from the UE that has been piggybacked in an RRCSetupComplete service operation for indicating that the UE is entering a CONNECTED mode.

During 7011, the AMF prepares UE context data for a session associated with this CONNECTED mode, and signals the UE context data to the MN 702. This UE context data may comprise, for example, packet data unit (PDU) session context data, a Security Key for the session, an indication of the UE's 701 Radio Capability and/or an indication of the UE's 701 Security Capabilities, etc.

During 7012, the MN 702 signals the UE 701. This signalling may comprise a command to activate Access Stratum (AS) security between the UE 701 and the MN 702.

During 7013, the UE 701 signals the MN 702. This signalling may comprise a response to the signalling of 7012. This signalling may comprise an indication that the requested security mode of 7012 has been activated.

During 7014, the MN 702 signals the UE 701. This signalling may comprise an RRC reconfiguration request for the UE 701 to perform. This reconfiguration may be to set up a signalling radio bearer (such as, for example a second signalling radio bearer (SRB2)) and data radio bearers (DRBs) for UE 701, or SRB2 and optionally DRBs for Integrated Access and Backhaul-Mobile Termination (IAB-MT). SRB2 is a radio bearer for transmission of Non-Access Stratum (NAS) messages from the UE to the network, and is set up after security activation. Prior to security activation, NAS messages may be signalled from the UE to the network using a first signalling radio bearer (SRB1).

During 7015, the UE 701 signals the MN 702 to indicate that the requested RRC reconfiguration of 7014 has been completed.

During 7016, the MN 702 signals the AMF 704. This signalling may inform the AMF 704 that the MN 701 has completed a setup procedure with the UE. This signalling of 7016 may comprise an Initial Context Setup Response service operation. This signalling of 7016 may be a response to the signalling of 7011.

During 7017, the MN 702 signals the UE 701. This signalling may comprise a request fora DC/CA measurement report from the UE 701 (i.e., a measurement report that comprises measurements made in accordance with the configuration of 7006 and 7007. This signalling of 7017 may comprise a UE information request service operation.

During 7018, the UE 701 signals the MN 702. This signalling may comprise the measurements requested during 8017. This signalling may comprise a DC/CA measurement report. This signalling may comprise a UE information report service operation.

During 7019, a cell addition setup procedure may be triggered based on the UE provided DC/CA measurement of 7018.

Figure 8:
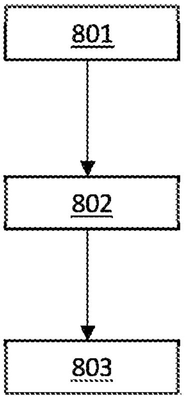
FIGS. 8 and 9 illustrate example operations that may be performed by apparatus described herein.
Figure 9:

FIGS. 8 and 9 illustrate aspects of the above with reference to actions that may be performed by specific aspects. It is therefore understood that above-mentioned features may find correspondence in the below-description of FIGS. 8 and 9. Further, it is understood that elements of the above may be implemented within the framework discussed below. It is understood that in the following and the above, reference is made to dual carrier and carrier aggregation. It is understood that the presently described techniques may FIG. 8 illustrates operations that may be performed by a user equipment.

During 801, the user equipment receives, from a serving network access node when the user equipment is in an energy saving mode, an early paging indication and first reconfiguration information, the first reconfiguration information comprising a first configuration for configuring the user equipment for performing measurements for a plurality of cells. The early paging indication may be an indication that the user equipment will be paged to enter a non-energy saving mode (e.g., a CONNECTED mode, such as an RRC CONNECTED mode).

During 802, the user equipment performs first measurements according to the first configuration when the user equipment is in the energy saving mode.

During 803, the user equipment, depending on the first measurements, identifies and performs at least one action.

For example, the at least one action may comprise at least one of: reporting the first measurements to the serving network access node, applying a candidate cell configuration related to the measured cell (e.g., applying a cell reconfiguration), or selecting and connecting to a cell for providing network access to the user equipment.

The identifying and performing at least one action may comprise causing the first measurements to be reported by: receiving, from the serving network access node when the user equipment is in an energy saving mode, a paging message after receiving the early paging indication; signalling, to the serving network access node, an indication that the first measurements are available or an indication that measurement values previously signalled to the network access node are valid; transitioning to the connected mode after signalling said indication that the first measurements are available or the indication that measurement values previously signalled to the network access node are valid; and after said transitioning, signalling the first measurements to the serving network access node.

The user equipment may, prior to entering the energy saving mode: receive, from the serving network node, a second configuration for configuring the user equipment to perform second measurements for at least one of dual carrier operation and/or carrier aggregation operation, and, after entering the energy saving mode and before receiving the first configuration: perform second measurements according to the second configuration until a timer associated with the second configuration expires or until the first measurements according to the first configuration are performed.

The user equipment may provide at least some of the second measurements to the serving network access node.

FIG. 9 illustrates operations that may be performed by a serving network access node serving a user equipment. The serving network access node may be the serving network node mentioned in relation to FIG. 8. The user equipment may be the user equipment mentioned above in relation to FIG. 8. The serving network access node may be a master node.

During 901, the serving network access node signals, to the user equipment when the user equipment is in an energy saving mode, an early paging indication and first reconfiguration information, the first reconfiguration information comprising a first configuration for configuring the user equipment to perform first measurements for a plurality of cells (e.g., to perform measurements on transmissions made by the plurality of cells). The The serving network access node may receive, from the user equipment when the user equipment is in a connected mode, the first measurements made in accordance with the first configuration and/or an indication of a cell selected by the user equipment for providing network access to the user equipment, or an indication of a candidate cell configuration related to the measured cell applied by the user equipment.

The serving network access node may signal, to the user equipment when the user equipment is in the energy saving mode, a paging message after signalling the early paging indication; and receive, from the user equipment, an indication that the first measurements are available or an indication that measurement values previously signalled to the network access node are valid.

The serving network access node may, prior to the user equipment entering the energy saving mode: signal, to the user equipment, a second configuration for configuring the user equipment to perform second measurements for at least one of dual carrier operation and/or carrier aggregation operation.

The serving network access node may group the user equipment into a first group in dependence on a similarity of at least one capability or configuration of the user equipment to other user equipment in the first group. For example, user equipment that are determined to comprise a similar capability or configuration may be comprised within a same group. The similarity may be determined in dependence on at least one preconfigured condition. For example, the similarity may be determined in dependence on respective locations of the UEs relative to a specific location, and/or respective mobilities of the UEs, etc. For example, UEs determined to be moving at a speed and/or velocity falling within a first range may be placed in a first group, UEs determined to be moving at a speed and/or velocity falling within a second range may be placed in a second group, and so on.

The serving network access node may determine to configure the user equipment with the first reconfiguration information in dependence on a determination that: a number of user equipment currently being served by at least one cell and/or carrier being considered for dual carrier and/or carrier aggregation is above a first predetermined threshold, a current load of at least one cell and/or carrier being considered for dual carrier and/or carrier aggregation is above a second predetermined threshold, an availability of at least one cell and/or carrier being considered for dual carrier and/or carrier aggregation, and/or whether a determined service is supported by at least one cell and/or carrier being considered for dual carrier and/or carrier aggregation.

The serving network access node may signal the first configuration to at least one access node controlling at least one of said plurality of cells. This may be useful for informing neighbouring nodes that a specific UE has already been configured.

In relation to both the examples of FIGS. 8 and 9, the energy saving mode may be at least one of a radio resource control IDLE mode and a radio resource control INACTIVE mode.

In relation to both the examples of FIGS. 8 and 9, the first configuration may comprise an instruction to perform at least one of the following for said configuring the user equipment for performing measurements: stop performing any previously configured dual carrier and/or carrier aggregation measurement configuration; start performing any previously configured dual carrier and/or carrier aggregation measurement configuration; switch from obtaining measurements according to a first previously configured measurement configuration to obtaining measurements according to a second previously configured measurement configuration; perform measurements using a higher or lower periodicity than a periodicity previously used to perform measurements; perform measurements over a single carrier and/or cell; stop performing any previously configured dual carrier and/or carrier aggregation measurement configuration after a preconfigured timer has expired; continue performing any previously configured dual carrier and/or carrier aggregation measurement configuration after a preconfigured timer has expired; store and/or erase measurements obtained using a previously configured dual carrier and/or carrier aggregation measurement configuration; or determine a validity of at least one previously performed measurement.

In relation to both of FIGS. 8 and 9, configuring the user equipment for performing measurements for a plurality of cells is may be for configuring at least one of dual carrier operation and/or carrier aggregation operation. In other words, the measurements made according to the first configuration/first reconfiguration may be used for determining how dual carrier aggregation and/or carrier aggregation is to be performed for the user equipment. For examples, which cell(s) is to be used for signalling traffic to and/or from the user equipment.

In relation to both of FIGS. 8 and 9, the first configuration may comprise at least one of: a list of cells; a list of early paging indicators that maps to a list of cells; a list of paging occasions that maps to a list of cells; or an indication of a user equipment action to be performed when a measurement of at least one of said plurality of cells fulfils a predetermined condition. It is understood that a mapping (e.g., of cells to respective paging occasions and/or of paging occasions to respective cells) may be signalled as part of the first configuration.

As mentioned above, the proposed mechanism improves DC/CA measurement so that the measurements can be performed efficiently and be available when needed. This helps to setup DC/CA faster which is beneficial for both the UE and network (improves the UE throughput and enables the network to balance the load between different carriers). The present mechanism also contributes to lower UE power consumption during IDLE/INACTIVE mode by stopping or limiting DC/CA measurement to a specific frequency band or specific PSCells and SCells when it is unnecessary.

Figure 2:
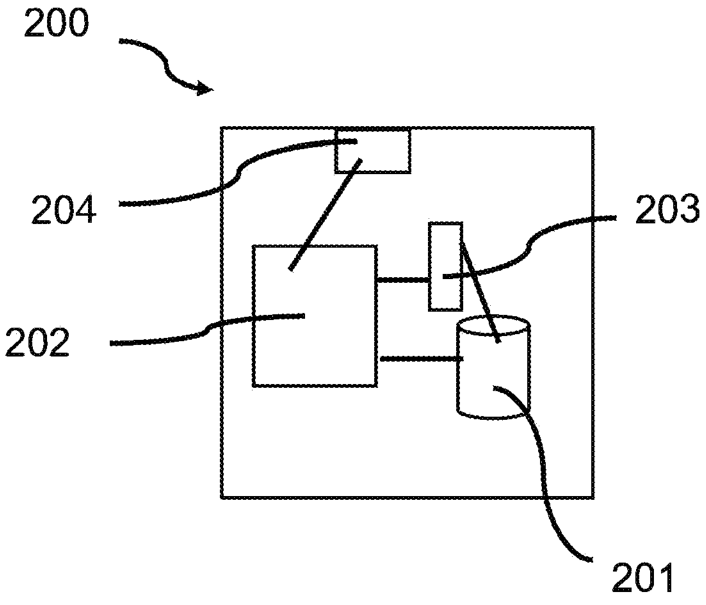
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR, and so forth. The control apparatus may be integrated with or external to a node or module of a core network or RAN. In some examples, base stations comprise a separate control apparatus unit or module. In other examples, the control apparatus can be another network element, such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions.

Figure 3:
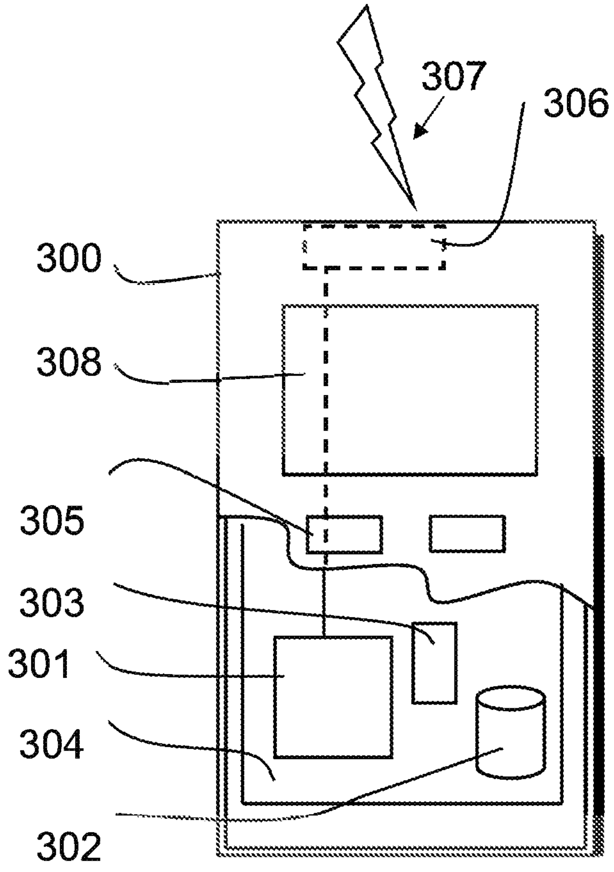
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is referred to as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. As described herein, the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided, for example, by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of Tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
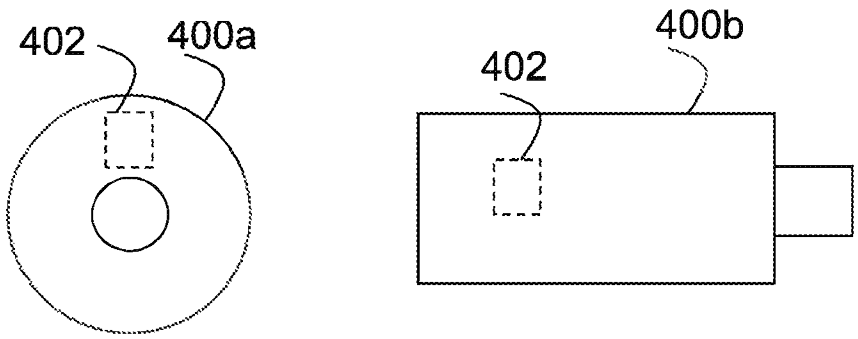
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400*a* (e.g. computer disc (CD) or digital versatile disc (DVD)) and 400*b* (e.g. universal serial bus (USB) memory stick) storing instructions and/or parameters 402 which when executed by a processor allow the processor to perform one or more of the steps of the methods of FIG. 8 and/or FIG. 9, and/or methods otherwise described previously.

As provided herein, various aspects are described in the detailed description of examples and in the claims. In general, some examples may be implemented in hardware or special purpose circuits, software, logic or any combination thereof. For example, some aspects may be implemented in hardware, while other aspects may be implemented in firmware or software which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in FIGS. 8 and/or 9, and/or otherwise described previously, may represent program steps, or interconnected logic circuits, blocks and functions, or a combination of program steps and logic circuits, blocks and functions. The software may be stored on such physical media as memory chips, or memory blocks implemented within the processor, magnetic media (such as hard disk or floppy disks), and optical media (such as for example DVD and the data variants thereof, CD, and so forth).

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multicore processor architecture, as nonlimiting examples.

Additionally or alternatively, some examples may be implemented using circuitry. The circuitry may be configured to perform one or more of the functions and/or method steps previously described. That circuitry may be provided in the base station and/or in the communications device and/or in a core network entity.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of non-limiting examples a full and informative description of some examples. However, various modifications and adaptations may become apparent to those skilled in the relevant arts in view of the foregoing description, when read in conjunction with the accompanying drawings and the claims. However, all such and similar modifications of the teachings will still fall within the scope of the claims.

In the above, different examples are described using, as an example of an access architecture to which the described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 5:
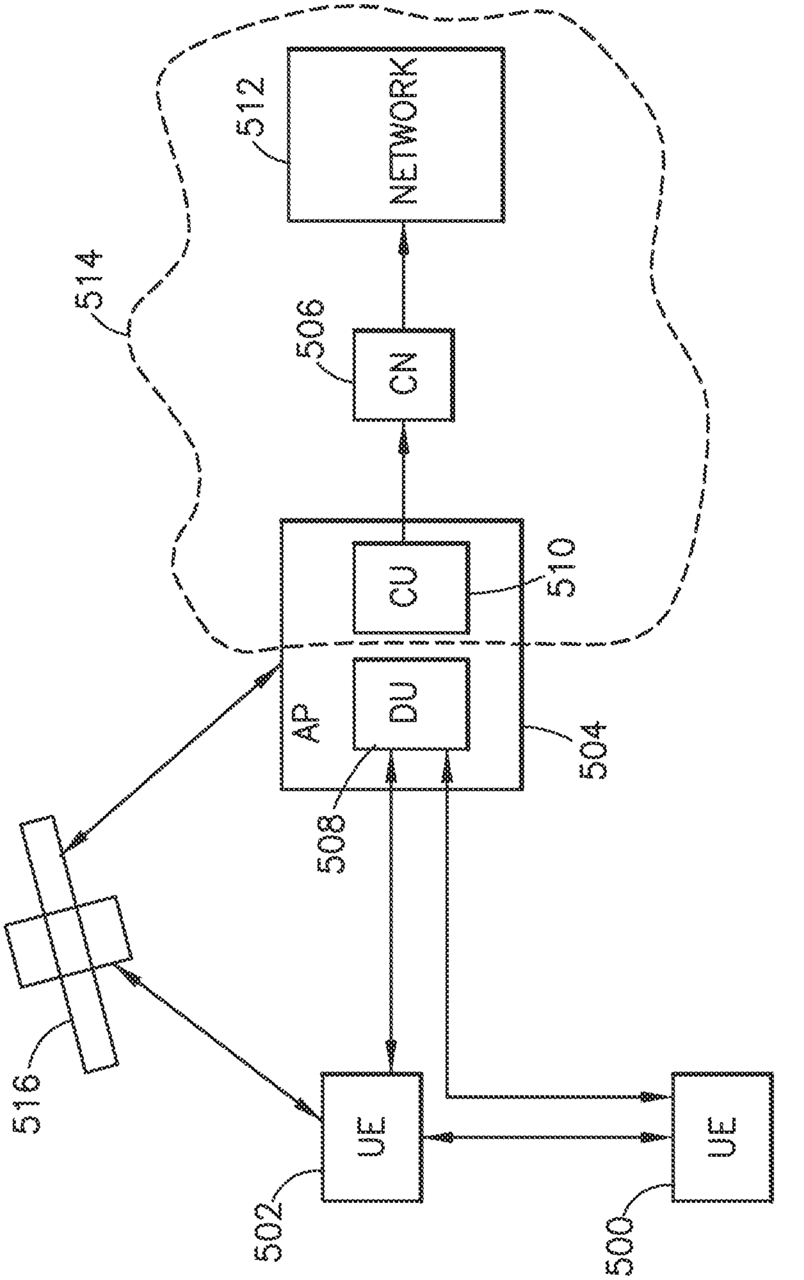
FIG. 5 shows a schematic representation of a network.

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504 and satellite 516. The node 504 is further connected to a core network 506. In one example, the node 504 may be an access node such as (e/g)NodeB serving devices in a cell. In one example, the node 504 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 506 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cm Wave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The LTE network architecture is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 5 by "cloud" 514). This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 5 may provide any kind of these cells. A cellular radio system may be implemented as a multilayer network including several kinds of cells.

The invention claimed is:

1. A user equipment, the user equipment comprising at least one processor and at least one memory including computer code for one or more programs, the at least one memory and the computer code configured, with the at least one processor, to cause the user equipment at least to:

receive, from a serving network access node when the user equipment is in an energy saving mode, an early paging indication and a first configuration for configuring the user equipment for performing measurements for a plurality of cells;

perform first measurements according to the first configuration when the user equipment is in the energy saving mode; and depending on the first measurements, identify and perform at least one action;

wherein the identifying and performing at least one action comprises causing the first measurements to be reported by:

receiving, from the serving network access node when the user equipment is in an energy saving mode, a paging message after receiving the early paging indication;

signalling, to the serving network access node, an indication that the first measurements are available or an indication that measurement values previously signalled to the network access node are valid;

transitioning to the connected mode after signalling said indication that the first measurements are available or the indication that measurement values previously signalled to the network access node are valid; and after said transitioning to the connected mode, signalling the first measurements to the serving network access node.

2. The user equipment as claimed in claim 1, the user equipment being further configured to, prior to entering the energy saving mode:

receive, from the serving network node, a second configuration for configuring the user equipment to perform second measurements for at least one of dual carrier operation and/or carrier aggregation operation;

and, after entering the energy saving mode and before receiving the first configuration:

perform second measurements according to the second configuration until a timer associated with the second configuration expires or until the first measurements according to the first configuration are performed.

3. The user equipment as claimed in claim 2, the user equipment being further configured to provide at least some of the second measurements to the serving network access node.

4. The user equipment as claimed in claim 1, wherein the at least one action comprises: reporting the first measurements to the serving network access node, applying a candidate cell configuration related to the measured cell, or selecting and connecting to a cell for providing network access to the user equipment.

5. The user equipment as claimed in claim 1, wherein the early paging indication and the first configuration for configuring the user equipment for performing measurements for the plurality of cells are received together in a structure comprising at least one bit for the early paging indication and at least one bit for the first configuration, for configuring the user equipment for performing measurements for the plurality of cells.

6. The user equipment as claimed in claim 1, wherein the first configuration comprises an instruction for the user equipment to switch from obtaining measurements according to a first previously configured measurement configuration to obtaining measurements according to a second previously configured measurement configuration, for the configuring of the user equipment for performing the measurements for the plurality of cells.

7. The user equipment as claimed in claim 1, wherein the early paging indication comprises an indication that the user equipment will be paged to enter the connected mode.

8. A serving network access node serving a user equipment, the serving network access node comprising at least one processor and at least one memory including computer code for one or more programs, the at least one memory and the computer code configured, with the at least one processor, to cause the access node at least to:

signal, to the user equipment when the user equipment is in an energy saving mode, an early paging indication and a first configuration for configuring the user equipment to perform first measurements for a plurality of cells;

signal, to the user equipment when the user equipment is in an energy saving mode, a paging message after signaling the early paging indication;

receive, from the user equipment, signaling of an indication that the first measurements are available or an indication that measurement values previously signalled to the serving network access node are valid; and receive, from the user equipment when the user equipment is in a connected mode, the first measurements made in accordance with the first configuration.

9. The serving network access node as claimed in claim 8, the serving network access node being further configured to receive, from the user equipment when the user equipment is in a connected mode, an indication of a cell selected by the user equipment for providing network access to the user equipment, or an indication of a candidate cell configuration related to the measured cell applied by the user equipment.

10. The serving network access node as claimed in claim 8, the serving network access node being further configured to, prior to the user equipment entering the energy saving mode:

signal, to the user equipment, a second configuration for configuring the user equipment to perform second measurements for at least one of dual carrier operation and/or carrier aggregation operation.

11. The serving network access node as claimed in claim 10, the serving network access node being further configured to group the user equipment into a first group in dependence on a similarity of at least one capability or configuration of the user equipment to other user equipment in the first group.

12. The serving network access node as claimed in claim 8, the serving network access node being further configured to determine to configure the user equipment with the first configuration in dependence on a determination that: a number of user equipment currently being served by at least one cell and/or carrier being considered for dual carrier and/or carrier aggregation is above a first predetermined threshold, a current load of at least one cell and/or carrier being considered for dual carrier and/or carrier aggregation is above a second predetermined threshold, an availability of at least one cell and/or carrier being considered for dual carrier and/or carrier aggregation, and/or whether a determined service is supported by at least one cell and/or carrier being considered for dual carrier and/or carrier aggregation.

13. The serving network access node as claimed in claim 8, the serving network access node being further configured to signal the first configuration to at least one access node controlling at least one of said plurality of cells.

14. The serving network access node as claimed in claim 8, wherein the energy saving mode is at least one of a radio resource control IDLE mode or a radio resource control INACTIVE mode.

15. The serving network access node as claimed in claim 8, wherein the first configuration comprises an instruction to perform at least one of the following for said configuring the user equipment for performing measurements:

stop performing any previously configured dual carrier and/or carrier aggregation measurement configuration;

start performing any previously configured dual carrier and/or carrier aggregation measurement configuration;

switch from obtaining measurements according to a first previously configured measurement configuration to obtaining measurements according to a second previously configured measurement configuration;

perform measurements using a higher or lower periodicity than a periodicity previously used to perform measurements;

perform measurements over a single carrier and/or cell;

stop performing any previously configured dual carrier and/or carrier aggregation measurement configuration after a preconfigured timer has expired;

continue performing any previously configured dual carrier and/or carrier aggregation measurement configuration after a preconfigured timer has expired;

store and/or erase measurements obtained using a previously configured dual carrier and/or carrier aggregation measurement configuration; or determine a validity of at least one previously performed measurement.

16. The serving network access node as claimed in claim 8, wherein;

configuring the user equipment for performing measurements for a plurality of cells is for configuring at least one of dual carrier operation or carrier aggregation operation, and the first configuration comprises at least one of:

a list of cells;

a list of early paging indicators that maps to a list of cells;

a list of paging occasions that maps to a list of cells; or an indication of a user equipment action to be performed when a measurement of at least one of said plurality of cells fulfils a predetermined condition.

17. A method for a user equipment, the method comprising:

receiving, from a serving network access node when the user equipment is in an energy saving mode, an early paging indication and a first configuration for configuring the user equipment for performing measurements for a plurality of cells;

performing first measurements according to the first configuration when the user equipment is in the energy saving mode; and depending on the first measurements, identifying and performing at least one action;

wherein the identifying and performing at least one action comprises causing the first measurements to be reported by:

receiving, from the serving network access node when the user equipment is in an energy saving mode, a paging message after receiving the early paging indication;

signalling, to the serving network access node, an indication that the first measurements are available or an indication that measurement values previously signalled to the network access node are valid;

transitioning to the connected mode after signalling said indication that the first measurements are available or the indication that measurement values previously signalled to the network access node are valid; and after said transitioning to the connected mode, signalling the first measurements to the serving network access node.

18. A non-transitory computer readable medium comprising instructions stored thereon which, when executed by an apparatus, cause the apparatus to perform the method of claim 17.

19. A method for a serving network access node serving a user equipment, the method comprising:

signalling, to the user equipment when the user equipment is in an energy saving mode, an early paging indication and a first configuration for configuring the user equipment to perform first measurements for a plurality of cells;

signalling, to the user equipment when the user equipment is in an energy saving mode, a paging message after signaling the early paging indication;

receiving, from the user equipment, signaling of an indication that the first measurements are available or an indication that measurement values previously signalled to the serving network access node are valid; and receiving, from the user equipment when the user equipment is in a connected mode, the first measurements made in accordance with the first configuration.

20. A non-transitory computer readable medium comprising instructions stored thereon which, when executed by an apparatus, cause the apparatus to perform the method of claim 19.

* * * * *